United States Patent
Kuji et al.

(10) Patent No.: US 10,994,194 B2
(45) Date of Patent: May 4, 2021

(54) PROCESSING APPARATUS AND PROJECTION IMAGE GENERATION METHOD

(71) Applicant: Sony Interactive Entertainment Inc., Tokyo (JP)

(72) Inventors: Takuya Kuji, Tokyo (JP); Tsubasa Yamashita, Tokyo (JP); Chikoh Shirota, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 205 days.

(21) Appl. No.: 16/088,257

(22) PCT Filed: Feb. 22, 2017

(86) PCT No.: PCT/JP2017/006669
§ 371 (c)(1),
(2) Date: Sep. 25, 2018

(87) PCT Pub. No.: WO2017/179308
PCT Pub. Date: Oct. 19, 2017

(65) Prior Publication Data
US 2019/0351319 A1  Nov. 21, 2019

(30) Foreign Application Priority Data
Apr. 14, 2016 (JP) .............................. JP2016-081239

(51) Int. Cl.
*A63F 13/00* (2014.01)
*A63F 13/213* (2014.01)
(Continued)

(52) U.S. Cl.
CPC ............ *A63F 13/213* (2014.09); *A63F 13/25* (2014.09); *A63F 13/65* (2014.09)

(58) Field of Classification Search
None
See application file for complete search history.

(56) References Cited

U.S. PATENT DOCUMENTS

2009/0075733 A1* 3/2009 Andersen ................ A63F 13/26
463/34
2015/0085155 A1* 3/2015 Diaz Spindola ..... H04N 9/3176
348/222.1

FOREIGN PATENT DOCUMENTS

| JP | 2002102529 A | 4/2002 |
| JP | 2002247602 A | 8/2002 |
| JP | 2015092205 A | 5/2015 |

OTHER PUBLICATIONS

International Search Report for corresponding PCT Application No. PCT/JP2017/006669, 4 pages, dated May 16, 2017.
(Continued)

*Primary Examiner* — Jay Trent Liddle
*Assistant Examiner* — Alex F. R. P. Rada, II
(74) *Attorney, Agent, or Firm* — Matthew B. Dernier, Esq.

(57) ABSTRACT

A picked up image acquisition unit acquires a picked up image obtained by picking up an image of a region including a projection region projected by a projector. A recognition processing unit executes a recognition process of a card included in the picked up image. A projection image generation unit generates a projection image to be projected by the projector on the basis of the card recognized by the recognition processing unit. An instruction detection unit detects an instruction for the card. The recognition processing unit detects an object different from the card and provides detection information of the detected object to the instruction detection unit. The instruction detection unit then detects an instruction for the card from the detection information of the object provided thereto. The projection image (Continued)

generation unit generates a projection image on the basis of the instruction for the card.

7 Claims, 16 Drawing Sheets

(51) Int. Cl.
*A63F 13/25* (2014.01)
*A63F 13/65* (2014.01)

(56) References Cited

OTHER PUBLICATIONS

International Preliminary Report on Patentability and Written Opinion for corresponding PCT Application No. PCT/JP2017/006669, 12 pages, dated Aug. 16, 2018.
Nozomu Tanaka et al., "Augmented Environments for Playing Cards with a Projector-Camera System", IPSJ Interaction 2012, Information Processing Society of Japan, 1, pp. 647 to 652, [DVD-ROM] (Mar. 16, 2002) (for relevancy see JP Office Action cited below and International Search report for corresponding PCT/JP2017/006669, 4 pages previously cited in an IDS filed Sep. 21, 2018).
Yuichi Sato et al., "Trainingable Trading Card Game using RFID", Dai 72 Kai (Heisei 22 Nendo) Zenkoku Taikai Koen Ronbunshu (4), Information Processing Society of Japan, pp. 873 to 874, (Mar. 10, 2010)(for relevancy see JP Office Action cited below and International Search report for corresponding PCT/JP2017/006669, 4 pages previously cited in an IDS filed Sep. 21, 2018).
Office Action for corresponding Patent Application No. JP 2016-081239, 10 pages, dated May 9, 2017.

\* cited by examiner

DESIGNATE THE POSITION OF THE PLACED MARKER USING THE MOUSE.

FIG. 12
(a) 
(b) 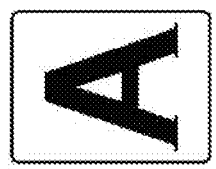
(c) 
(d) 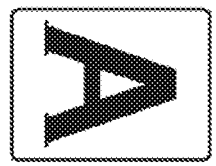

FIG.13
(a)
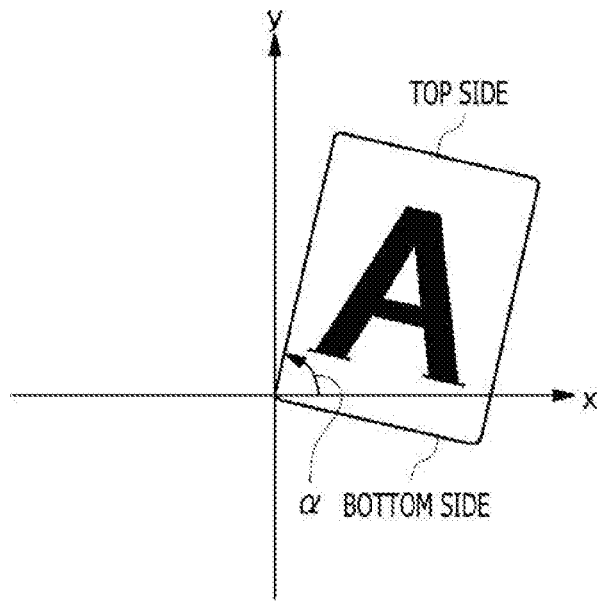
(b)
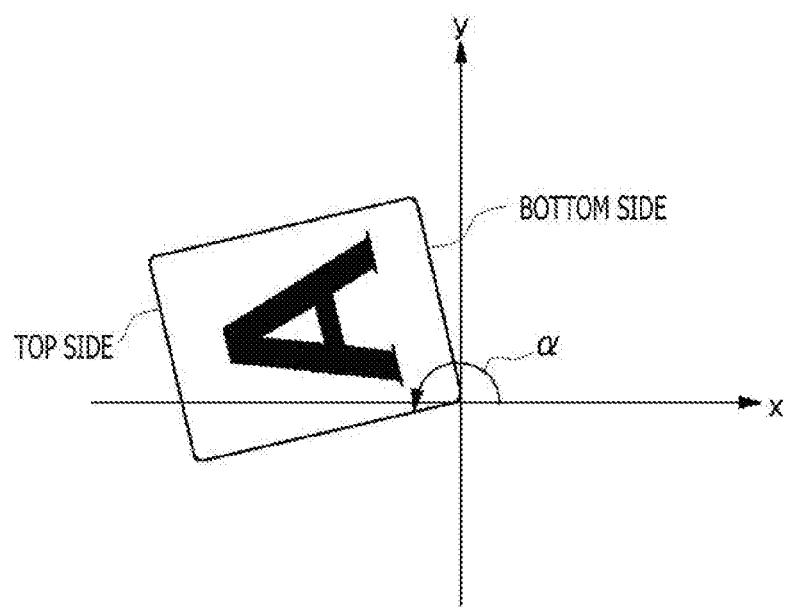

FIG.14
(a)
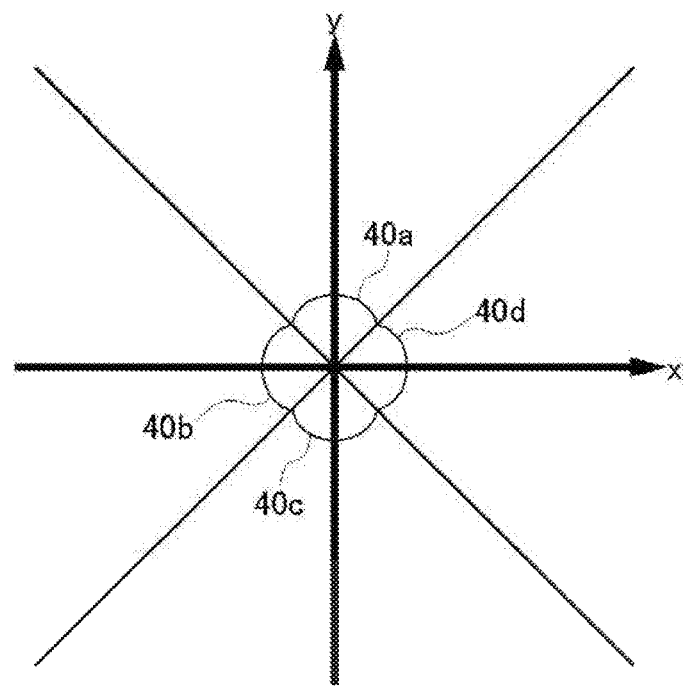
(b)
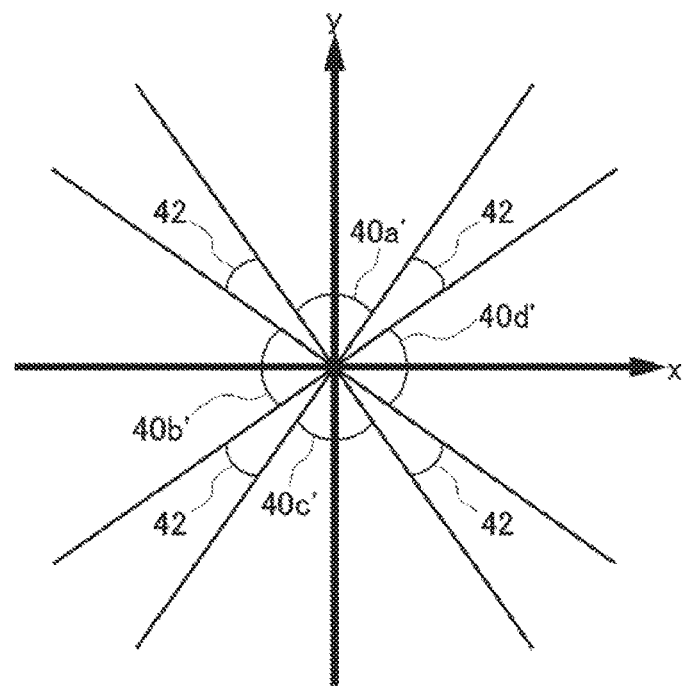

FIG.20
(a)
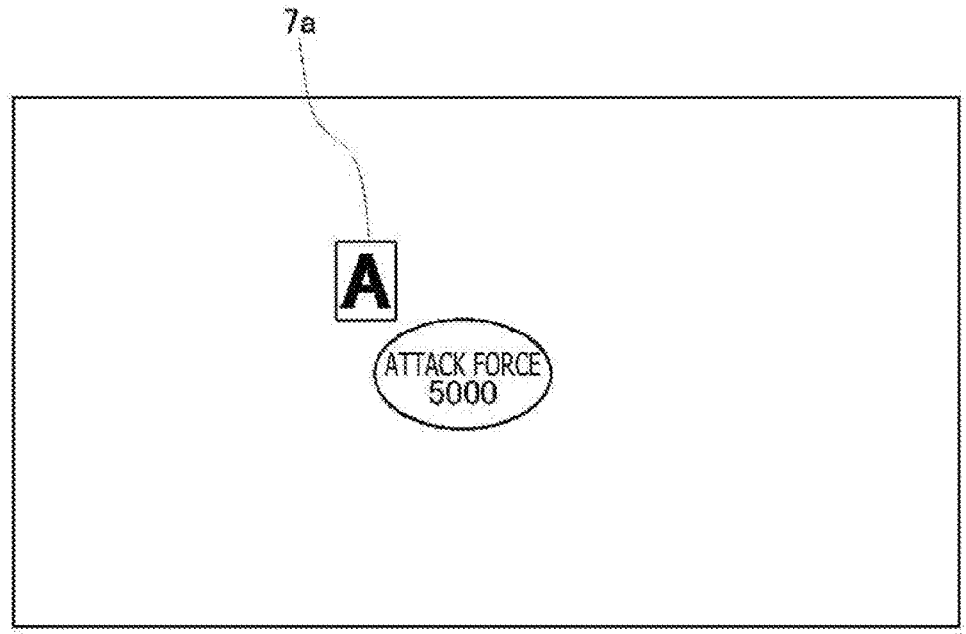
(b)
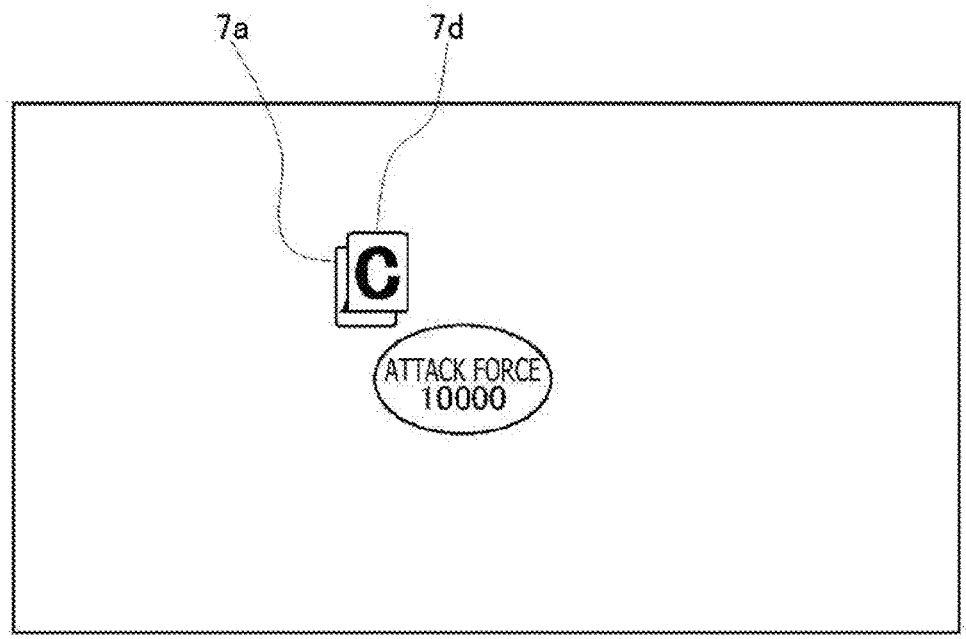

FIG.21
(a)
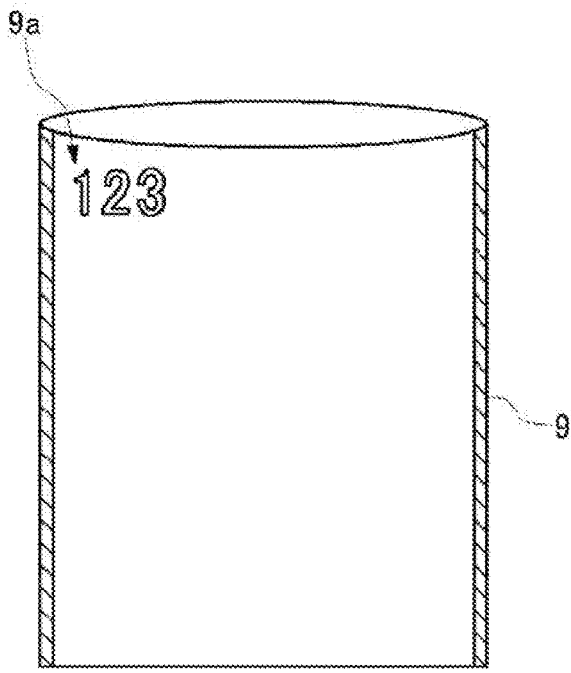
(b)
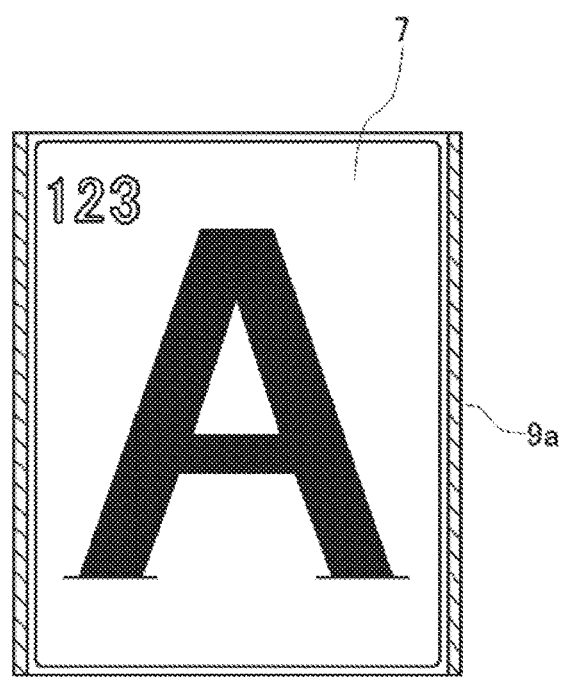

PROCESSING APPARATUS AND PROJECTION IMAGE GENERATION METHOD

TECHNICAL FIELD

The present invention relates to a technology for projecting an image from a projector that is a projection apparatus.

BACKGROUND ART

PTL 1 discloses an image projection system that includes a card to which a marker is applied, a projection apparatus that projects an image to the card, a card detection sensor for detecting the marker applied to the card, and a processing apparatus. The processing apparatus acquires a position at which the card is disposed using a result of detection of the card detection sensor, and the projection apparatus projects an image associated with the card.

CITATION LIST

Patent Literature

[PTL 1] JP 2015-92205A

SUMMARY

Technical Problem

In recent years, a trading card game (Collectable Card Game) machine is installed in a game center, a toy store, a supermarket or the like. In the trading card game, a user collects cards, and the user and an opponent presents a card each other to progress the game. Various pictures such as original monsters, characters of animation and so forth or letters are drawn on individual cards. A characteristic value for representing a performance, an attribute or the like of a character is set to each card, and the progress or winning or losing of the game is determined in response to a card presented by the user.

A technique for applying a performance by a projector to a card game as in the image projection system disclosed in PTL 1 provides a new way of enjoyment of the card game. The inventor of the present application has developed a technology for carrying out, in a system including a camera and a projector, a card game smoothly and another technology relating to a new user interface for performing a game operation.

It is an object of the present invention to provide a technology for carrying out a card game.

Solution to Problem

In order to solve the subject described above, a processing apparatus according to a certain mode of the present invention includes a picked up image acquisition unit configured to acquire a picked up image obtained by picking up an image of a region including a projection region projected by a projector, a recognition processing unit configured to execute a recognition process of a card included in the picked up image, a projection image generation unit configured to generate a projection image to be projected by the projector on a basis of the card recognized by the recognition processing unit, and an instruction detection unit configured to detect an instruction for the card. The recognition processing unit detects an object different from the card in the picked up image and provides detection information of the detected object to the instruction detection unit. The instruction detection unit detects an instruction for the card from the detection information of the object provided thereto. The projection image generation unit generates a projection image on a basis of the instruction for the card.

Another mode of the present invention is a method for generating a projection image projected by a projector. This method includes a step of acquiring a picked up image obtained by picking up an image of a region including a projection region projected by the projector, a step of executing a recognition process of a card included in the picked up image, a step of generating a projection image projected by the projector on a basis of the recognized card, and a step of detecting an instruction for the card. The step of executing the recognition process detects an object different from the card in the picked up image. The step of detecting an instruction detects an instruction for the card from detection information of the object. The step of generating a projection image generates a projection image on a basis of the instruction for the card.

It is to be noted that also arbitrary combinations of the components described above and conversions of the representation of the present invention between a method, an apparatus, a system, a recording medium, a computer program and so forth are effective as modes of the present invention.

BRIEF DESCRIPTION OF DRAWINGS

FIG. 12 illustrates views depicting a mode of a direction of a card.

FIG. 13 illustrates views depicting posture information.

FIG. 14 illustrates views depicting a criterion for deciding a direction of a card.

FIG. 20 illustrates views depicting an example of a projection image.

FIG. 21 illustrates views depicting a card sleeve.

DESCRIPTION OF EMBODIMENT

The present invention provides a technology for projecting image light from a projector that is a projection apparatus in response to a card disposed in a play area. A card to be used has a predetermined shape in the form of a flat plate, and the card has a mark applied thereto for specifying the card. If an infrared camera picks up an image of the mark and a processing apparatus detects the mark included in the picked up image, then the processing apparatus controls an irradiation light pattern of the projector to cause image light for increasing the game performance to be projected from the projector. The mark may be configured as a one-dimensional or two-dimensional pattern such as a code, a design or the like.

Figure 1:
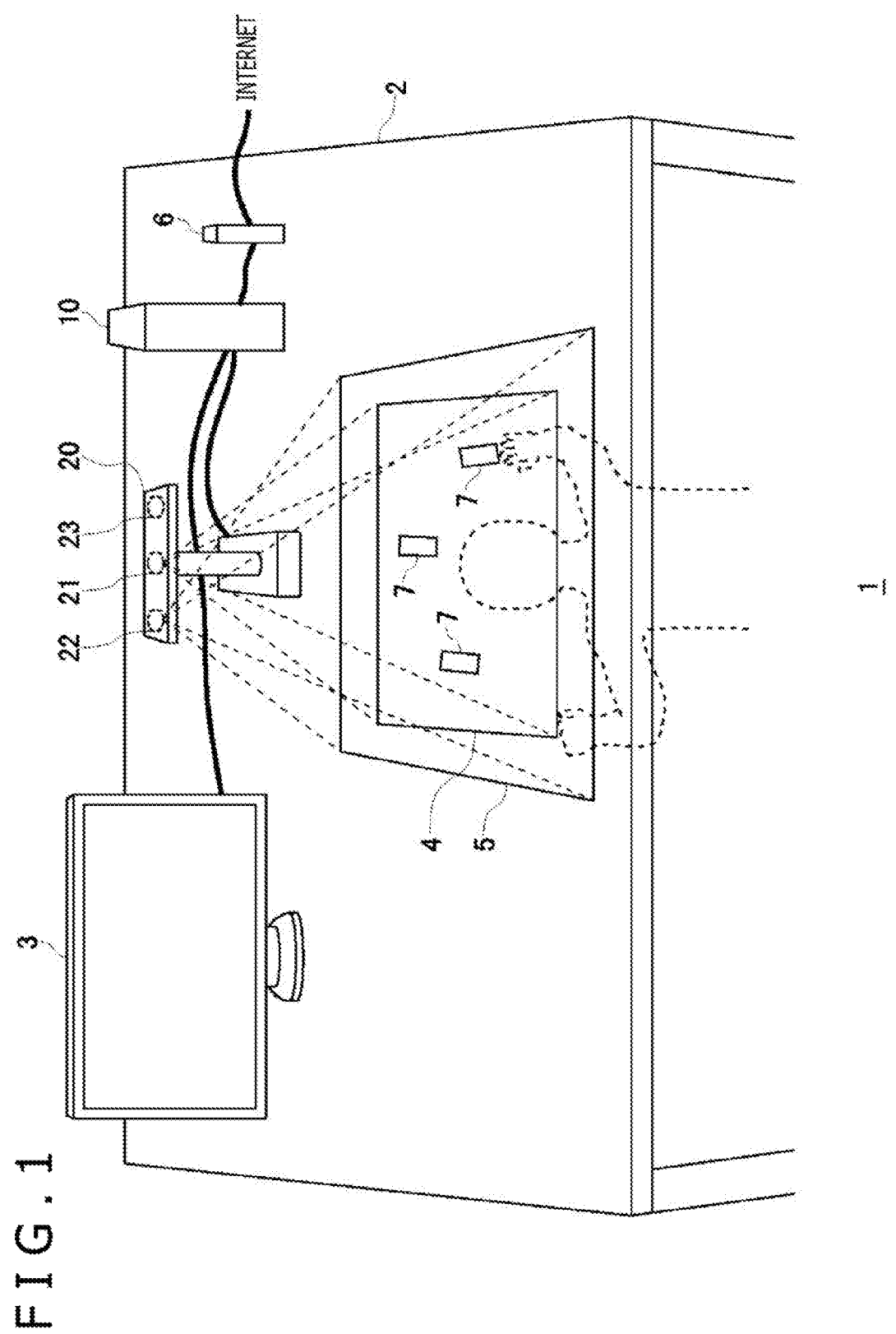
FIG. 1 is a view depicting a configuration of an image projection system according to an embodiment.

FIG. 1 depicts a configuration of an image projection system 1 according to an embodiment of the present invention. The image projection system 1 includes a processing apparatus 10 that carries out a process relating to a game and an optical apparatus 20 that supplies a picked up image to the processing apparatus 10 and to which a projection image is supplied from the processing apparatus 10. A user interface apparatus for allowing a user to perform inputting such as a keyboard, a mouse, a game controller or the like is connected to the processing apparatus 10. The optical apparatus 20 includes a projector 21, an infrared camera 22, and a visible light camera 23. It is to be noted that, while it is preferable to integrally accommodate the projector 21 and the infrared camera 22 in the optical apparatus 20, the visible light camera 23 may be provided on a housing different from that of the optical apparatus 20. Further, the optical apparatus 20 may include a second infrared camera independently of the infrared camera 22.

The projector 21 irradiates projection light to form a projection region 4. The projection region 4 has a substantially quadrangular shape on a projection plane, and the projection region 4 defines a region (play area) within which the user disposes a card 7 to play a game. While the projector 21 in the embodiment forms the projection region 4 on a table 2, the projection plane may be any face on which a card 7 can be disposed. Regarding the projector 21, it is preferable for projection light to be controlled in advance such that the projection region 4 has a substantially rectangular shape on the projection plane. It is to be noted that, while the user may dispose the card 7 outside the projection region 4, a performance image by the projector 21 is not projected to a place outside the projection region 4.

The infrared camera 22 picks up an image of an image pickup region 5. In order to increase the image pickup sensitivity, the infrared camera 22 may include an infrared light source. In the embodiment, the image pickup region 5 at least includes the projection region 4 by the projector 21, and, in other words, the infrared camera 22 picks up an image of a range greater than the projection region 4.

A picked up image of the infrared camera 22 is supplied to the processing apparatus 10 and is utilized for detection of an actual object. While the actual object that is a detection target in the embodiment representatively is the rectangular card 7, it includes an object that generates an instruction for the card 7 such as, for example, a finger of a hand of the user, a game coin and so forth. It is to be noted that an object such as a finger of a hand of the user may be detected on the basis of a picked up image by the second infrared camera.

Since the user plays a card game at a position facing the optical apparatus 20 as depicted in FIG. 1, the projection region 4 that forms a play area is set between the infrared camera 22 and the user. The infrared camera 22 picks up an image of the projection region 4 from an oblique direction, and, as a result, an image of the nearer side of the image pickup region 5 (near side to the infrared camera 22) is picked up relatively great while an image of the farther side of the image pickup region 5 (farther side from the infrared camera 22) is relatively small. Since the infrared camera 22 cannot pick up an image of the projection region 4 from a vertical direction with respect to the table 2, an image of the card 7 is picked up not in an original rectangular shape but in a shape distorted depending upon the distance from the infrared camera 22.

It is to be noted that, while the play area in FIG. 1 is set between the user and the optical apparatus 20, the optical apparatus 20 may be disposed horizontally forwardly of the user and irradiate projection light from a horizontal direction such that the play area is formed in front of the user. Also in this case, since the infrared camera 22 picks up an image such that the nearer side of the image pickup region 5 (nearer side to the infrared camera 22) is relatively great while an image of the farther side of the image pickup region 5 (farther side from the infrared camera 22) is relatively small, an image of the card 7 is picked up in a distorted shape.

The picked up image of the infrared camera 22 is supplied to the processing apparatus 10 on the real time basis, and the processing apparatus 10 detects a mark of the card 7 included in the picked up image and recognizes the card 7. The recognition process is a process for comparing the detected mark with a plurality of marks registered in a database to search out a coinciding mark, and, if the detected mark is distorted, then a trouble sometimes occurs in the recognition process.

Therefore, the processing apparatus 10 of the embodiment performs a calibration process for correcting a picked up image such that an image of the card 7 picked up by the infrared camera 22 has an original rectangular shape before a card game is started. In particular, the calibration process is a process for determining a conversion matrix for converting a picked up image from an oblique direction by the infrared camera 22 into a picked up image picked up from just above the projection region 4 and a homography matrix for correcting the aspect ratio of the converted picked up image, and by determining a parameter for correction before starting of the game, after starting of the game, a recognition process of the card 7 is performed on the basis of a correction image obtained by correcting the picked up image. Ideally, the correction image is an image picked up when the infrared camera 22 is disposed just above the projection region 4. Before starting of the game, the processing apparatus 10 causes a display apparatus 3 to display the picked up image of the infrared camera 22 such that the user can smoothly progress a work relating to calibration.

Also the visible light camera 23 picks up an image of the picked up image region on the table 2 similarly to the infrared camera 22. The visible light camera 23 is provided for distributing a manner of game play by the user to a network such as the Internet. Since, if a distribution image is distorted, then also the user who receives the distribution is hard to see the distribution image, it is preferable for the processing apparatus 10 to carry out a calibration process similar to that by the infrared camera 22 to distribute a corrected picked up image.

An access point (hereinafter referred to as "AP") 6 has functions of a wireless access point and a router, and the processing apparatus 10 connects to the AP 6 through wireless communication or wired communication to connect to the Internet. The user can match game with a different user who connects to the Internet, and the processing apparatus 10 distributes a picked up image of the visible light camera 23, accurately, an image obtained by correcting a picked up image, to the different user and receives a picked up image from the different user and then causes the received image to be displayed from the display apparatus 3. In this manner, the visible light camera 23 is utilized for distribution of game play.

In order to implement network battle, the image projection system 1 may be prepared also on the opponent side. Such a network system may be constructed in which the processing apparatus 10 can record a game record into a server for exclusive use on the Internet and can browse a game record of the user itself or a game record of a different user.

The processing apparatus 10 executes a recognition process of a card 7 included in a picked up image of the infrared camera 22 and controls image projection of the projector 21. While the processing apparatus 10 may be a game machine for exclusive use in which an application program of a card game (hereinafter referred to also as "card game program") is executed, it may otherwise be a personal computer that executes the program. The processing apparatus 10 has a function for receiving a picked up image from the infrared camera 22 and generating a projection image in response to a card 7 disposed in the play area. Although hereinafter described, the processing apparatus 10 not only carries out a performance corresponding to the recognized one card 7, but generates a projection image dynamically such that interest of the user in the game is increased in response to a state of the recognized card 7, a combination of a plurality of cards 7, presence or absence of an instruction from the user relating to the card 7 or the like to control image projection of the projector 21.

To the card 7, a marker that cannot be viewed by the user but can be detected by a nonvisible light sensor such as an infrared sensor may be added as an identification mark as disclosed, for example, in PTL 1. This marker is a mark for exclusive use added to the card 7 for allowing the processing apparatus 10 to perform card recognition, and, in order to improve the detection accuracy of the infrared sensor, it is preferable to print the marker with a nonvisible light reflection material or a nonvisible light absorption material.

It is to be noted that pattern matching accuracy of an image is improved by development of the image recognition technology in recent years. Therefore, also a design itself such as an illustration drawn on the card 7 can be utilized as an identification mark for uniquely identifying the card 7. In trading card games spread at present, several hundred kinds of cards are normally available, and various designs such as original monsters, characters and so forth are drawn on the cards. While the user distinguishes each card depending upon the design, also the processing apparatus 10 of the embodiment similarly identifies a card picked up by the infrared camera 22 on the basis of the design. In short, in the image projection system 1 of the embodiment, since the design of the card is utilized as an identification mark, an environment is provided in which cards for a trading card game distributed at present can be used as they are to play a game.

In order to implement the environment just described, the processing apparatus 10 prepares a database in which designs of all cards 7 in the game or feature points of the designs are registered in advance. The processing apparatus 10 has information relating to the designs of all cards 7 registered in the database in a form in which the information can be compared with the designs of the cards 7 of picked up images.

Figure 2:
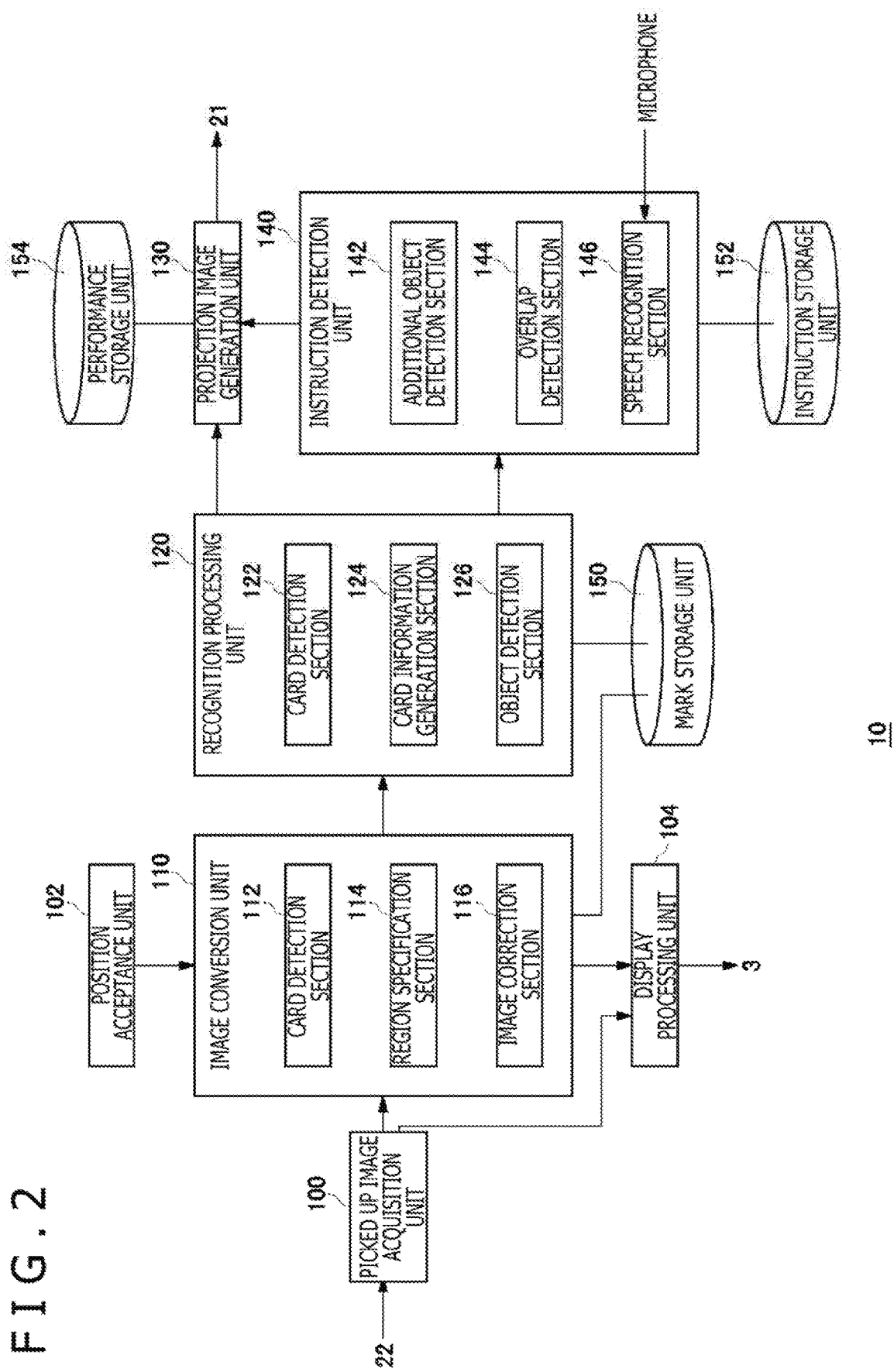
FIG. 2 is a view depicting functional blocks of a processing apparatus.

FIG. 2 depicts functional blocks of the processing apparatus 10. The processing apparatus 10 includes, as processing functions, a picked up image acquisition unit 100, a position acceptance unit 102, a display processing unit 104, an image conversion unit 110, a recognition processing unit 120, a projection image generation unit 130, and an instruction detection unit 140. The processing apparatus 10 further includes, in an auxiliary storage apparatus such as a hard disk drive (HDD), a mark storage unit 150, an instruction storage unit 152, and a performance storage unit 154. The mark storage unit 150 is a database in which a plurality of marks for comparing marks (designs) included in picked up images by pattern matching are stored.

The processing functions of the processing apparatus 10 in the present embodiment are implemented by a central processing unit (CPU), a memory, a program loaded in the memory and so forth, and here, a configuration implemented by collaboration of them is depicted. Accordingly, it is recognized by those skilled in the art that the functional blocks can be implemented in various forms only from hardware, only from software, or from a combination of hardware and software.

<Calibration Process>

As described hereinabove, in the image projection system 1 of the embodiment, in order for the infrared camera 22 to pick up an image of the image pickup region 5 from an oblique direction, a card 7 of the picked up image has a shape distorted in response to the distance from the infrared camera 22. Therefore, the processing apparatus 10 determines a correction parameter for eliminating the distortion of the card 7 of the picked up image in advance before the game is started, and carries out, after the game is started, a card recognition process on the basis of a correction image obtained by correcting the picked up image using the correction parameter. The card game program has a calibration mode and a game mode, and before execution of the game mode, the calibration mode is executed to determine an appropriate correction parameter according to the play environment. It is to be noted that the program for calibration is included in system software of the processing apparatus 10, and before execution of the game program, the system software may determine a correction parameter and supply a corrected picked up image to the game program.

The picked up image acquisition unit 100 acquires a picked up image obtained by picking up an image of a region which at least includes a projection region 4 of a substantially quadrangular shape projected by the projector 21. During execution of the calibration mode, the display processing unit 104 receives a picked up image picked up by the infrared camera 22 from the picked up image acquisition unit 100 and rotates, before the picked up image is displayed on the display apparatus 3, the picked up image by 180 degrees such that the user is positioned at a lower portion of the screen image to display the picked up image. In the image projection system 1 of the embodiment, since the infrared camera 22 picks up an image of the image pickup region 5 positioned between the infrared camera 22 and the user, the picked up image of the infrared camera 22 is reversed in the upward and downward direction from that in a state in which the user views the image pickup region 5. Therefore, the display processing unit 104 causes the display apparatus 3 to display the picked up image in a state rotated by 180 degrees such that an image that does not give a feeling of strangeness to the user is output from the display apparatus 3.

Figure 3:
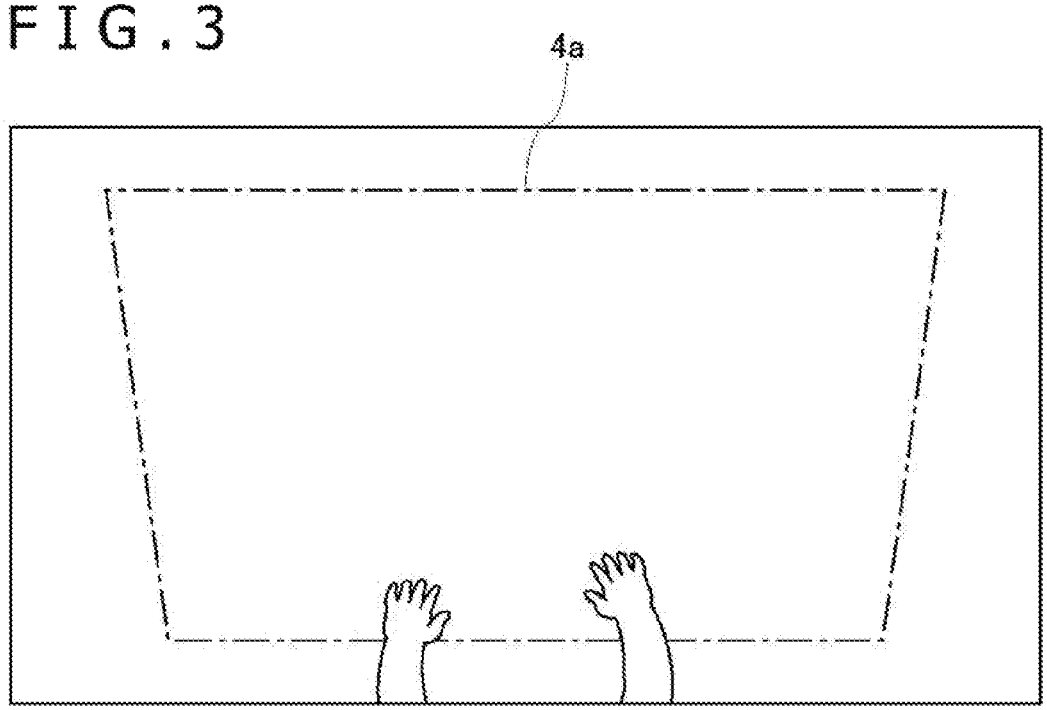
FIG. 3 is a view depicting an initial screen image in a calibration mode.

FIG. 3 depicts an initial screen image in the calibration mode. In the calibration mode, the display processing unit 104 causes a 180-degree rotated image of a picked up image of the infrared camera 22 to be displayed on the display apparatus 3. In the initial screen image depicted in FIG. 3, although the hands of the user are displayed in an upward direction from a lower portion of the screen image, in the case where the display processing unit 104 does not perform a rotation process, the hands of the user are displayed in a downward direction from an upper portion of the screen image, which gives a feeling of strangeness. Therefore, the display processing unit 104 performs a rotation process of a picked up image.

In the calibration mode, the projector 21 irradiates projection light upon the table 2. If the power supply to the optical apparatus 20 is turned on, then the projector 21 automatically irradiates white light upon the table 2. However, the projection image generation unit 130 may otherwise perform projection control such that the projector 21 projects white light. It is to be noted that the projection light may not be white light but may be any light if this allows the user to view the projection region 4.

A projection region 4a indicated by a dash-dotted line in FIG. 3 virtually indicates a region of projection light irradiated upon the table 2. Although the projection region 4 is viewed on the table 2 by the user, the infrared camera 22 does not pick up an image reflection light of the projected white light. Therefore, the projection region 4a is not displayed on the display apparatus 3, and the user cannot confirm the projection region 4a from the screen image of the display apparatus 3.

Figure 4:
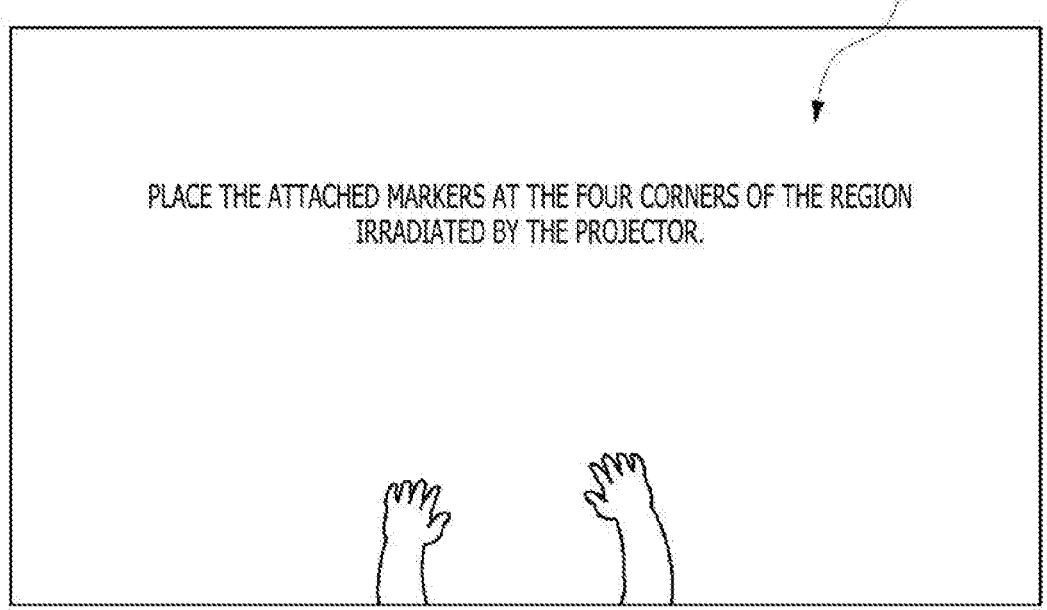
FIG. 4 is a view depicting a guide screen image.

FIG. 4 depicts a guide screen image displayed on the display apparatus 3. The display processing unit 104 displays a guide sentence 30a on the display apparatus 3. Here, attached markers are markers for calibration included in the optical apparatus 20 and are made from a material whose image can be picked up by the infrared camera 22. The user would place the markers at the four corners of the projection region 4 on the table 2 in accordance with the guide sentence 30a. The markers may be, for example, outline black circles. It is to be noted that the projection image generation unit 130 may generate a projection image including the guide sentence 30a such that the projection image is projected from the projector 21. The user would view the guide sentence 30a displayed on the projection region 4 and recognize a work to be carried out.

Figure 5:
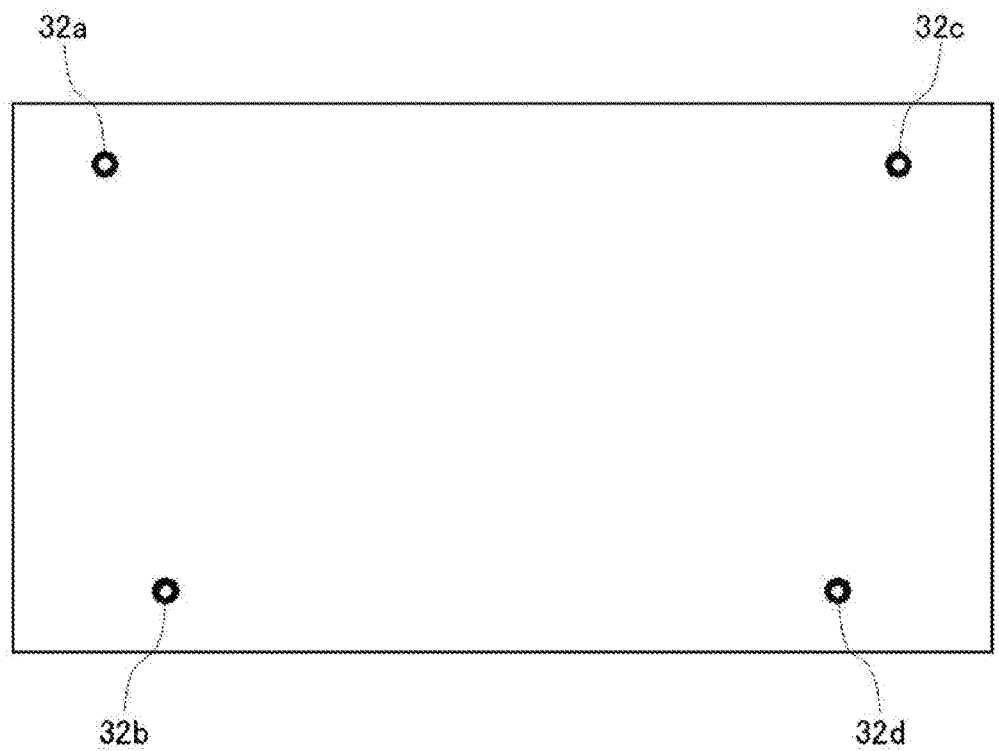
FIG. 5 is a view depicting black circle markers of a picked up image.

FIG. 5 depicts black circle markers 32a to 32d of a picked up image. At this time, the guide sentence 30a may remain displayed on the display apparatus 3. After the black circle marks are disposed in the four corners of the projection region 4 projected on the table 2, the user would operate the user interface apparatus to notify the processing apparatus 10 that the black circle marks are disposed. For example, to double click a mouse may be set as a trigger for notifying the processing apparatus 10 of completion of the work and advancement to a next work. It is to be noted that various triggers may be available as the trigger for advancing to a next work, and for example, in response to utterance of a predetermined word from the user, the processing apparatus 10 may perform speech analysis and recognize that the black circle markers are placed to advance to a next work.

Figure 6:
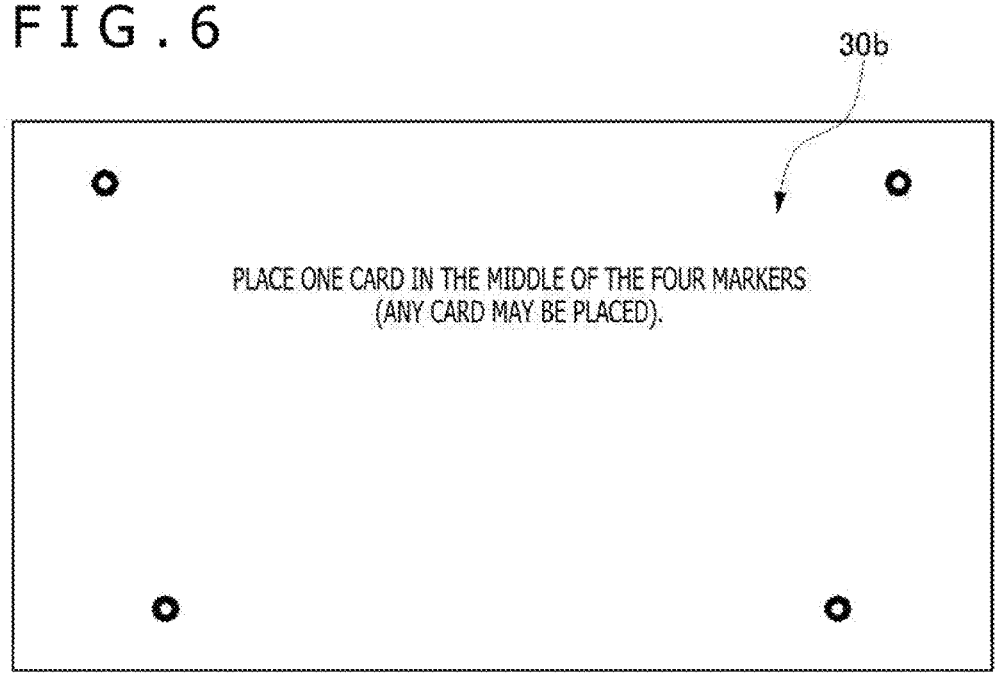
FIG. 6 is a view depicting a guide screen image.

FIG. 6 depicts a guide screen image displayed on the display apparatus 3. After the black circle markers are disposed, the display processing unit 104 causes a guide sentence 30b to be displayed. The user would dispose one card 7 at the center of the projection region 4 in accordance with the guide sentence 30b. At this time, the display processing unit 104 may cause information indicative of a disposition place for the card 7 to be displayed together with the guide sentence 30b. It is to be noted that the projection image generation unit 130 may generate a projection image including the guide sentence 30b and cause the projection image to be projected from the projector 21.

Figure 7:
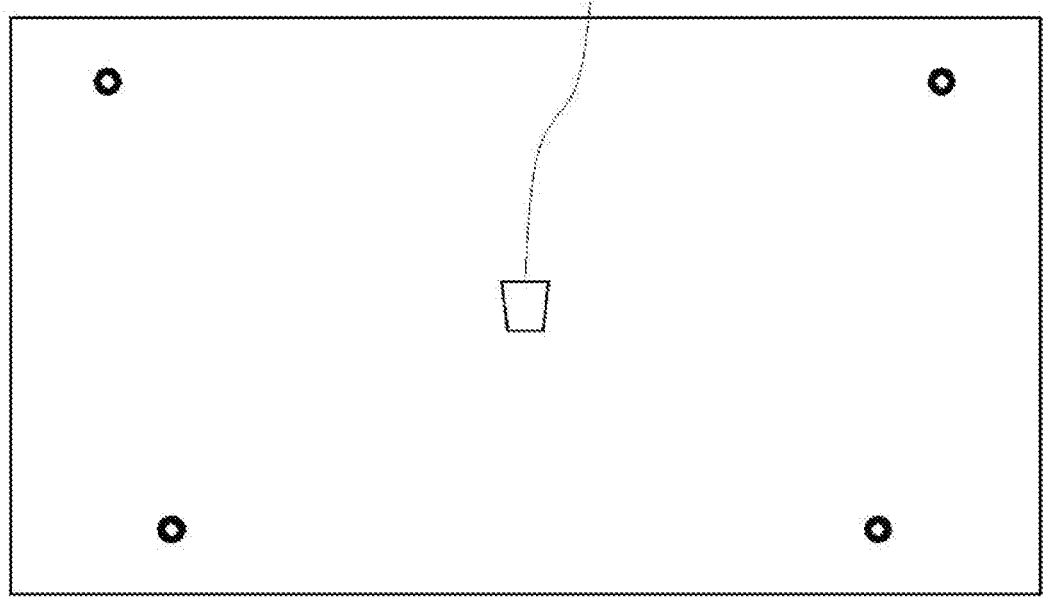
FIG. 7 is a view depicting an image obtained by image pickup of a card.

FIG. 7 depicts a picked up image of the card 7 placed in the projection region 4 by the user. Although, in FIG. 7, the card 7 is disposed in a vertical direction substantially at the center of the projection region 4, since the infrared camera 22 picks up an image of the projection region 4 from an obliquely upward direction, in the picked up image, the rectangular card 7 is picked up as an image of a trapezoidal shape. After the card 7 is disposed, the user would operate the user interface apparatus to notify the processing apparatus 10 that the card 7 is disposed.

Figure 8:
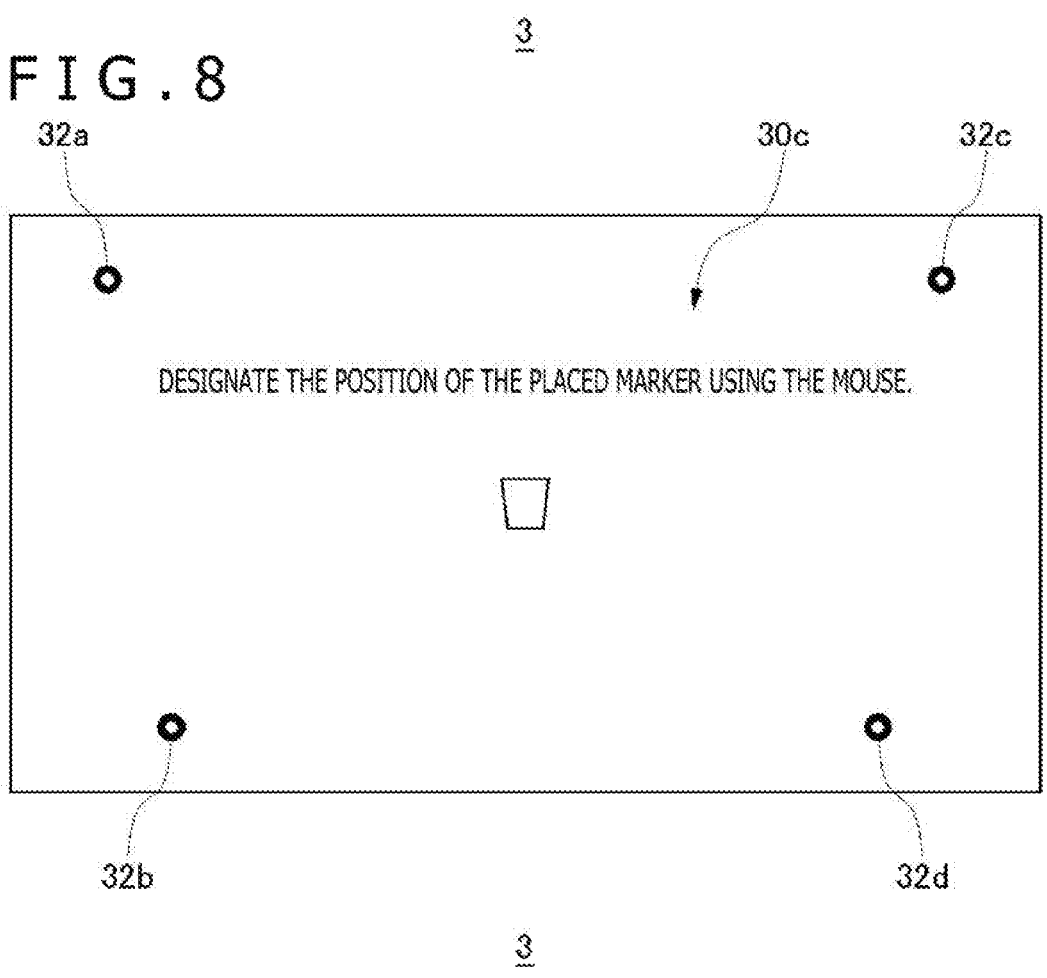
FIG. 8 is a view depicting a guide screen image.

FIG. 8 depicts a guide screen image displayed on the display apparatus 3. After the card 7 is disposed, the display processing unit 104 displays a guide sentence 30c. The user would apply the pointer of the mouse to the black circle markers 32a to 32d displayed on the guide screen image of the display apparatus 3 to perform a designation operation (click operation).

The position acceptance unit 102 accepts a position designation from the user on the picked up image displayed on the display apparatus 3. In particular, on the guide screen image depicted in FIG. 8, the position acceptance unit 102 accepts position coordinates on the picked up image designated through the mouse by the user. It is to be noted that, while the example indicates an example in which the mouse is used as the user interface apparatus, the user may move the pointer displayed on the display apparatus 3 through a game controller to perform position designation. In the image conversion unit 110, a region specification section 114 specifies a region of a quadrangular shape from the four designated positions accepted by the position acceptance unit 102.

It is to be noted that the region specification section 114 may automatically detect the four black circle markers from the picked up image of the black circle markers 32a to 32d to specify the quadrangular region. Since the region specification section 114 stores the shape of the markers for calibration in advance, it can extract the black circle markers 32a to 32d from the picked up image and specify position coordinates of them. In the case where the region specification section 114 automatically detects the black circle markers, the mark designation operation by the user becomes unnecessary, and therefore, there is no necessity to display the guide sentence 30c.

In this manner, the region specification section 114 specifies a quadrangular region in a picked up image by the infrared camera 22 by a designation operation of the user or by automatic detection of the markers. This quadrangular region defines a region for allowing the user to dispose the card 7 and accordingly defines a correction region of the picked up image. In the game mode, an image correction section 116 corrects the image at least in the quadrangular region specified by the region specification section 114. It is to be noted that, while, in the embodiment, an example in which black circle markers are disposed in the four corners of the projection region 4 is depicted, the quadrangular region that defines the correction region may be set on the inner side of the projection region 4 or may be set to the outer side of the projection region 4 within the range of the image pickup region 5. If the quadrangular region is set on the inner side of the projection region 4, then the image correction section 116 determines the quadrangular region on the inner side as a target region of image correction, but if the quadrangular region is set to the outer side of the projection region 4, then the image correction section 116 determines the quadrangular region on the outer side as a target region of image correction.

The mark storage unit 150 stores the marks of all cards 7 prepared in the card game and identification information of the cards 7 (hereinafter referred to as card identifications (IDs)) in an associated relationship with each other. In the embodiment, a mark is a design of a character or the like drawn on the surface of a card 7, and the mark storage unit 150 may store feature patterns representing positional relationships of a plurality of feature points extracted in advance for the individual marks and the card IDs in an associated relationship with each other. A card detection section 112 extracts feature points of marks of a card 7 from a picked up image and refers to the feature patterns of the plurality of marks stored in the mark storage unit 150 to specify the card ID of the card 7 disposed in the projection region. It is to be noted that the mark storage unit 150 has stored therein the center position of the card 7 in the feature pattern, and when the card detection section 112 detects coincident marks by pattern matching, the card detection section 112 can specify an inclination of the marks (posture of the card 7) included in the picked up image and the center position of the card 7.

It is to be noted that, in the calibration process, the object to be used is not limited to the card 7 but may be any object if an image of it can be picked up by the infrared camera 22 and the card detection section 112 can be detected from the picked up image. It is to be noted that, since, in the card game, a feature pattern of marks of each card 7 is registered in the mark storage unit 150 and the processing apparatus 10 has a card recognition engine incorporated therein, it is advantageous in many points to use a card 7 for a calibration process.

The image correction section 116 corrects a picked up image such that the card shape in a picked up image has a similar shape to a known shape of a card 7. First, the image correction section 116 performs a process for disposing the position of the infrared camera 22 that is picking up an image of the projection region 4 from an oblique direction spuriously just above the projection region 4. According to this process, a three-dimensional space having the origin at the center position of the card 7 detected by the card detection section 112 is set, and an inclination θ between the card center position and the infrared camera 22 in the set three-dimensional space is derived to determine a transformation matrix for transforming the picked up image such that distortion of the picked up image according to the distance from the infrared camera 22 is eliminated. Since the infrared camera 22 that picks up an image of the projection region 4 from an oblique direction picks up the image such that the nearer side of the infrared camera 22 is greater and the farther side of the infrared camera 22 is smaller, the length of the picked up image per one pixel is made equal by performing the process for spuriously disposing the infrared camera 22 just above the projection region 4.

It is to be noted that, in the case where the optical apparatus 20 has a posture sensor and the image correction section 116 can autonomously detect the inclination θ of the infrared camera 22 with respect to the table 2 on the basis of sensor information of the posture sensor, the process for picking up an image of the card 7 may not be carried out. By acquiring the inclination θ, the image correction section 116 determines a transformation matrix for transforming a quadrangular region specified by the region specification section 114 from a state picked up in a trapezoidal shape into that of a rectangular shape.

The image correction section 116 performs a process for homography transforming the quadrangular region transformed in a rectangular shape to adjust the region so as to have an aspect ratio equal to that of the projection region 4 by the projector 21. The image correction section 116 utilizes the technology of homography transformation for correcting a rectangular quadrangular region into a rectangular region of a known aspect ratio to determine a homography matrix for performing projective transformation such that the quadrangular region specified by the region specification section 114 has a similar shape to the shape of the known projection region 4. After the homography matrix is determined, the image correction section 116 retains the determined homography matrix and utilizes the homography matrix in order to correct a picked up image in the game mode.

It is to be noted that, although the image correction section 116 may adjust the quadrangular region specified by the region specification section 114 so as to have a known aspect ratio of the projection region 4, it may determine a homography matrix for performing projection transformation, for example, such that the shape of the card 7 of a picked up image has a known aspect ratio of a rectangular shape.

Figure 9:
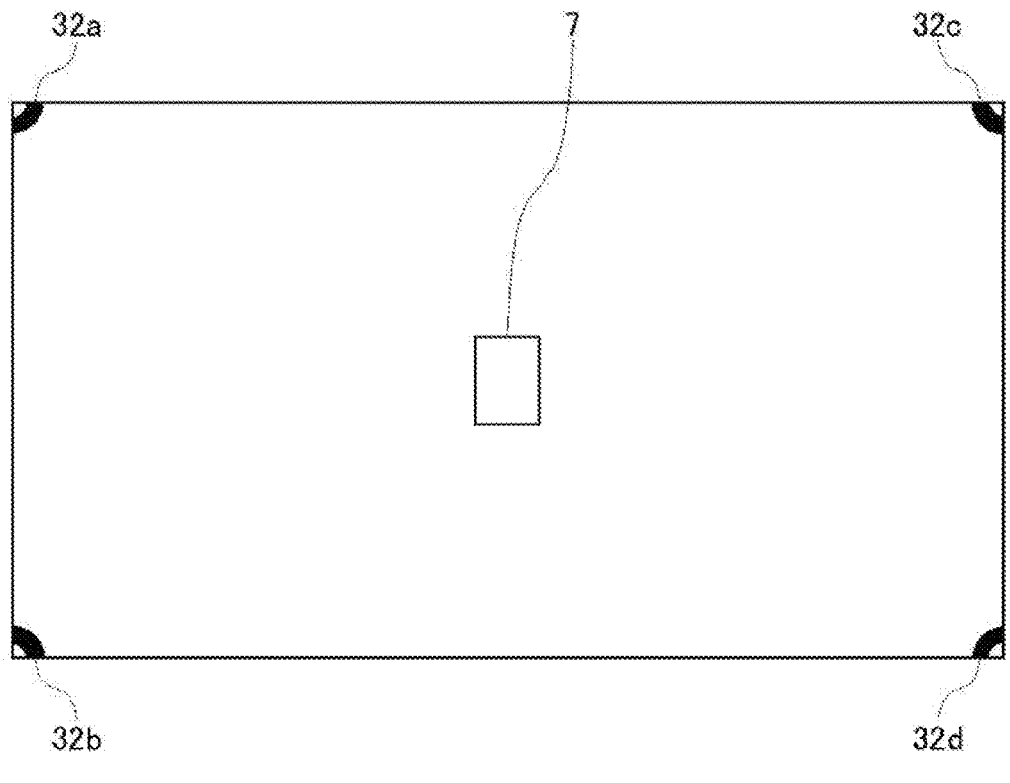
FIG. 9 is a view depicting a corrected image.

FIG. 9 depicts an image corrected by the image correction section 116. After the image correction section 116 determines the inclination θ of the infrared camera 22 and the homography matrix, it performs image conversion such that the infrared camera 22 is spuriously disposed just above and adjusts the quadrangular region specified by the region specification section 114 so as to have a rectangular shape using a transformation matrix, whereafter it corrects the rectangular region so as to have a known aspect ratio using the homography matrix. Consequently, as depicted in FIG. 9, the card image after the correction is displayed in a rectangular shape having a predetermined aspect ratio. A design of a character or the like is drawn on the card 7, and since the recognition processing unit 120 carries out a card recognition process on the basis of the design drawn on the card 7, by correcting the card image such that it has a rectangular shape having a predetermined aspect ratio, the card recognition process by the recognition processing unit 120 can be carried out more appropriately. It is to be noted that, after the calibration process ends, the user would remove the black circle markers from the four corners of the projection region 4 and then enter the game mode.

As described above, the processing apparatus 10 carries out a calibration process. It is to be noted that the object to be used in calibration is not limited to the card 7 but may be a different object whose center position can be detected by the card detection section 112. After the image correction section 116 determines a correction parameter (in short, the inclination θ (transformation matrix) and the homography matrix), it thereafter generates a picked up image corrected using the correction parameter and supplies the picked up image to the recognition processing unit 120. At this time, in order that the processing load by the recognition processing unit 120 may not increase, preferably the image correction section 116 cuts out the image region specified by the region specification section 114 and supplies a correction image in which the cut out region is image transformed to the recognition processing unit 120. It is to be noted that, although it depends upon the application, also it is possible for the image correction section 116 to further reduce the processing load to the recognition processing unit 120 by cutting out only a predetermined area from within the image region specified by the region specification section 114 and supplying a correction image of the cut out area to the recognition processing unit 120.

The correction parameters including the transformation matrix and the homograph matrix for correcting the inclination θ of the infrared camera 22 are retained in and utilized by the image conversion unit 110 until the main power supply to the processing apparatus 10 is turned off. However, in the case where an inclination to the table 2 of the optical apparatus 20 is changed, it is necessary to carry out a calibration process once again to re-determine the correction parameters.

<Card Recognition Process>

The mark storage unit 150 stores marks of all cards prepared in the card game and card IDs of the cards 7 in an associated relationship with each other. As described hereinabove, in the embodiment, the mark is a design of a character or the like drawn on the surface of the card 7, and the mark storage unit 150 stores a feature pattern representative of a positional relationship of a plurality of feature points extracted in advance for each mark and a card ID in an associated relationship with each other. It is to be noted that some card (hereinafter referred to as rare card) exists which has been subject to special processing such that an observable design differs depending upon the angle. The mark storage unit 150 stores, for each rare card, all marks that can be viewed from the individual angles and one card ID in an associated relationship with each other such that, from whichever direction a design of a card 7 is detected, one card ID is specified.

In the embodiment, for the convenience of description, a card 7 having a design of "A" or "B" printed on the surface thereof is used.

Figure 10:
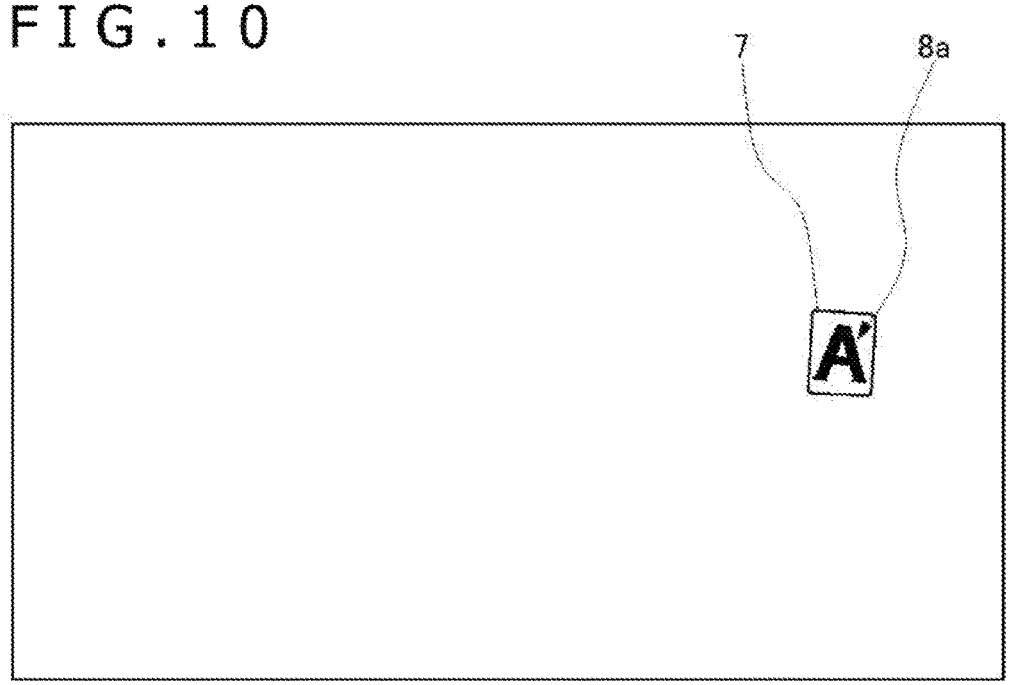
FIG. 10 is a view depicting an example of a corrected picked up image.

FIG. 10 depicts an example of a picked up image corrected by the image correction section 116. In the example, a card 7 having a design "A" printed thereon is disposed in the projection region 4. The picked up image acquisition unit 100 acquires a picked up image obtained from the infrared camera 22 that picks up an image of a region including the projection region 4 of a substantially quadrangular shape projected by the projector 21. The image correction section 116 corrects an infrared reflection image picked up cyclically on the basis of an inclination θ and a homography matrix to generate a correction image and provides the correction image to the recognition processing unit 120. For example, the image pickup cycle is 1/60 second, and the image correction section 116 may correct a picked up image of the projection region 4 in a cycle equal to the image pickup cycle. However, the image correction section 116 may correct the picked up image of the projection region 4 in a lower cycle than the image pickup cycle (namely, to sample out picked up images) in order to reduce the processing load.

The recognition processing unit 120 includes a card detection section 122, a card information generation section 124, and an object detection section 126 and executes a recognition process of a card 7 included in a picked up image. It is to be noted that, although the card detection section 122 in the recognition processing unit 120 and the card detection section 112 in the image conversion unit 110 are depicted as separate components in FIG. 2, both of them may be configured from a same card recognition engine in the processing apparatus 10.

The card detection section 122 searches a feature pattern of a plurality of marks stored in the mark storage unit 150 from within a picked up image. The card detection section 122 carries out a pattern matching process for comparing the feature patterns of marks stored in the mark storage unit 150 with the feature pattern of a mark 8a extracted from within the projection region. The card detection section 122 compares the feature pattern of the mark 8a included in the picked up image with the feature patterns retained in the mark storage unit 150 to specify a feature pattern coincident with the mark 8a and specifies a card ID associated with the feature pattern. In this example, a card ID associated with the mark "A" stored in the mark storage unit 150 is specified.

It is to be noted that, while, in the example depicted in FIG. 10, the card detection section 122 carries out a detection process of a mark from an image picked up from within the entire projection region 4, depending upon an application, the projection region 4 may be divided into a plurality of areas for disposing a card 7. In this case, only it is necessary for the card detection section 122 to carry out a detection process of a card 7 in each area, and since the area can be restricted, the processing time period for pattern matching can be reduced.

Generally, the card 7 has the top and the bottom, and usually, one of short sides is the top side and the other of the short sides is the bottom side. The mark storage unit 150 retains a feature pattern of a mark 8 such that the top and the bottom of the card 7 are positioned correctly. It is to be noted that such a card 7 may otherwise have long sides one of which serves as the top side and the other one of which serves as the bottom side. The card detection section 122 extracts a mark 8a from a picked up image and compares the mark 8a with the marks 8 stored in the mark storage unit 150, and if a coincident mark 8 is detected, then the card detection section 122 specifies center coordinates of the detected mark 8 (center coordinates of the card 7) and the inclination of the mark 8a (posture of the card 7).

The card detection section 122 specifies what number of times a feature pattern of a mark stored in the mark storage unit 150 is to be rotated until the mark becomes coincident with the feature pattern of the mark 8a included in the picked up image. This posture information (angle information) indicates the posture of the card 7 in the two-dimensional coordinate system of the corrected picked up image and is represented as an inclination of the left side or the right side extending from the bottom side to the top side of the card 7. The posture information is described with reference to FIG. 13.

It is to be noted that, in the image projection system 1 that utilizes the card 7, an actual world coordinate system in the projection region 4, a camera coordinate system in the infrared camera 22 and a projector coordinate system in the projector 21 exist independently of each other. The processing apparatus 10 includes a coordinate adjustment function for automatically adjusting the coordinate systems. By the coordinate adjustment function, position coordinates of a mark 8 detected by the infrared camera 22 are transformed into and handled as position coordinates in the projection region 4, and position coordinates in the projection region 4 are transformed into and handled as position coordinates of the projector coordinate system of the projector 21. In the following, it is assumed that the processing apparatus 10 has the coordinate adjustment function, and for the convenience of description, in the following description, various position coordinates are identified as position coordinates of the two-dimensional coordinate system in the projection region 4.

If the card detection section 122 detects a card ID, center coordinates, and posture information of a card 7, then the card information generation section 124 generates card information to be used in an application. Here, the card information generation section 124 generates a card ID and posture information of a card 7, and vertex coordinates of the four corners of the card 7 as card information and provides the card information to the projection image generation unit 130 and the instruction detection unit 140. It is to be noted that the card information generation section 124 is aware of the size of the card 7 and can determine the vertex coordinates of the four corners of the card 7 from the center coordinates and the posture information provided from the card detection section 122.

The card detection section 122 carries out the card recognition process in a predetermined cycle and provides the detected card ID, center coordinates, and posture information of the card 7 to the card information generation section 124. For example, the card detection section 122 may carry out the card recognition process in synchronism with an image pickup cycle of the infrared camera 22. It is to be noted that the card detection section 122 may carry out a tracking process for the card 7 recognized already and provide the card ID, center coordinates, and posture information of the card 7 to the card information generation section 124.

<Game Control>

The performance storage unit 154 stores performance contents in an associated relationship with a card ID. The performance storage unit 154 may store a card ID and a performance pattern that is a still image or a moving image in an associated relationship with each other. It is to be noted that the performance storage unit 154 may store a performance pattern in which a card ID and a game scene are associated with each other. The projection image generation unit 130 preferably generates a moving image that is normally moving around the card 7, for example, such a moving image that increases an expectation of a user or presence of the game. The projection image generation unit 130 generates a projection image to be projected by the projector 21 on the basis of the card 7 recognized by the recognition processing unit 120. The function of the projection image generation unit 130 is implemented by the card game program and generates a projection image from the performance contents associated with the card ID in response to the progress of the game.

The projection image generated by the projection image generation unit 130 is projected to the projection region 4 by the projector 21. In the card recognition process, since the infrared camera 22 can pick up an image of the card 7 without being influenced by the projection light from the projector 21, the recognition processing unit 120 can carry out a specification process of the card 7 appropriately on the basis of the picked up image by the infrared camera 22. It is to be noted that, since the visible light camera 23 picks up an image also of a performance projected by the projector 21, it is not suitable for an application for card recognition.

The projection image generation unit 130 controls image projection of the projector 21 in accordance with a performance pattern stored in the performance storage unit 154. In particular, the projection image generation unit 130 reads out a performance image associated with the card ID provided from the recognition processing unit 120 from the performance storage unit 154 or generates a performance image in accordance with the performance pattern read out from the performance storage unit 154 and causes the projector 21 to project the performance image on the basis of position information of the card 7. For example, the projection image generation unit 130 may cause game operation information relating to the progress such as an explanation relating to a game rule, an operation method of the card 7 or the like to be projected in the proximity of the card 7. Since the projection image generation unit 130 causes information for assisting a game operation to be projected in the proximity of the card 7 from the projector 21 in this manner, the user can progress the game smoothly.

It is to be noted that the projection image generation unit 130 preferably controls the projector 21 such that white light is projected on the card 7. The card 7 in the embodiment has a design drawn on the surface thereof, and the user would specify the card 7 depending upon the design. Therefore, if a performance image from the projector 21 is projected on the card 7, then although the performance effect increases, the visibility of the design degrades. Therefore, the projection image generation unit 130 can perform game performance without impairing the visibility of the card 7 by controlling the projector 21 so as to project white light on the card 7 on the basis of the vertex coordinates of the four corners of the card 7 supplied from the recognition processing unit 120.

It is to be noted that the projection image generation unit 130 may change the background image to be projected over the overall projection region 4 in response to the card 7 specified by the recognition processing unit 120. At this time, if a plurality of cards 7 are disposed in the projection region 4, then the projection image generation unit 130 may determine a background image in response to the combination of the plurality of cards 7. Alternatively, a card 7 for a background may be set in advance such that, if the card 7 for a background is specified, then the background image of the card 7 is projected.

Figure 11:
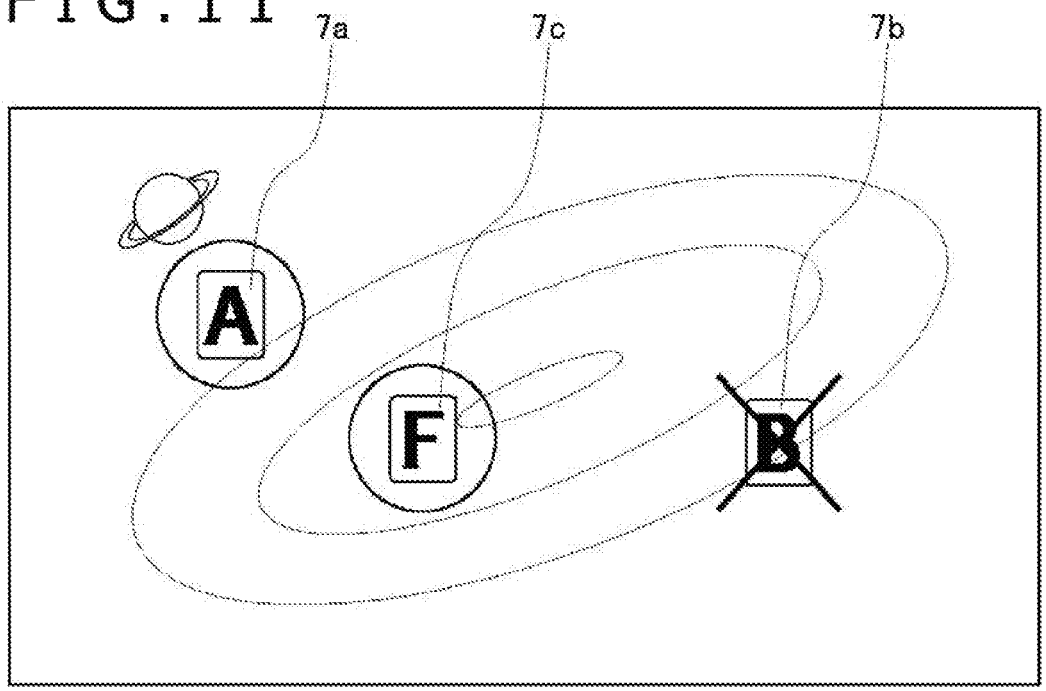
FIG. 11 is a view depicting an example of a projection image.

FIG. 11 depicts an example of a projection image projected to the projection region 4. The cards 7a to 7c are cards disposed in the projection region 4. While the projection image generation unit 130 is projecting white light to the cards 7a to 7c, it projects a performance image in which each of the cards 7a to 7c is surrounded by a circle and a cross mark is applied to the card 7b. The cards 7a to 7c each surrounded by a circle indicate that they are cards that can be operated and the card 7b to which a cross mark is applied indicates that the card 7b is a card that cannot be operated. The projection image generation unit 130 makes it possible for the user to progress the game smoothly by generating a projection image from which the user can recognize the state of the card 7 in this manner.

It is to be noted that, while it is explained that the projection image generation unit 130 causes a performance image associated with a card 7 to be projected from the projector 21, the projection image generation unit 130 may cause a performance image to be projected, for example, in response to a motion of a card 7. The projection image generation unit 130 may derive the speed and the advancing direction of a card 7 from a variation of position coordinates of the card 7 such that a performance image associated with the derived speed and advancing direction is projected to the projection region 4 from the projector 21.

<Game Operation>

As described hereinabove, the projection image generation unit 130 generates a projection image on the basis of the position of the card 7 or a card operation such as a motion of the card 7. In the following, a user interface that progresses a game by other operations is proposed.

In a card game, it is generally performed that a state of a card is represented by a direction of the card. For example, although a vertically directed card is operable, a horizontally directed card indicates that it cannot be operated temporarily. Alternatively, a vertically directed card may indicate that it is in a standby state and a horizontally directed card may indicate that it is in an attacking state. The state of a card represented by whether it is directed vertically or horizontally is determined suitably depending upon the game.

The projection image generation unit 130 receives a card ID, posture information, and vertex coordinates of four corners (hereinafter referred to also as position information) of the card 7 as card information from the recognition processing unit 120. The projection image generation unit 130 specifies the direction of the card 7 from the posture information provided thereto and generates a projection image according to the direction of the card 7. In the following, the provided posture information is an angle α.

FIG. 12(a) to FIG. 12(d) depict modes of the direction of a card 7 handled by the projection image generation unit 130. The card 7 depicted in FIG. 12(a) is specified as "upwardly directed"; the card 7 depicted in FIG. 12(b) is specified as "leftwardly directed"; the card 7 depicted in FIG. 12(c) is specified as "downwardly directed"; and the card 7 depicted in FIG. 12(d) is specified as "rightwardly directed." The projection image generation unit 130 specifies the direction of the card 7 included in the picked up image to one of the four upward, downward, leftward, and rightward directions.

FIG. 13(a) and FIG. 13(b) are views illustrating posture information provided from the recognition processing unit 120. The angle α is represented as an inclination of a side (for example, the left side) extending from the bottom side to the top side of the card 7. The angle α is specified as an angle from the x axis that is the axis of abscissa when the left vertex of the bottom side of the card 7 is disposed at the origin of the virtual two-dimensional coordinate system.

FIG. 14(a) indicates a first criterion for deciding a card direction. An upward decision region 40a indicates a region whose angle α is equal or greater than 45 degrees but is smaller than 135 degrees. A leftward decision region 40b indicates a region whose angle α is equal to or greater than 135 degrees but is smaller than 225 degrees. A downward decision region 40c indicates a region whose angle α is equal to or greater than 225 degrees but is smaller than 315 degrees. A rightward decision region 40d is a region whose angle α is equal to or greater than 315 degrees but smaller than 360 degrees or is equal to or greater than 0 degree but smaller than 45 degrees.

The first criterion depicted in FIG. 14(a) defines a decision region indicative of the range in the upward, downward, leftward, or rightward direction. As apparent from comparison with a second criterion depicted in FIG. 14(b), in the first criterion, the individual decision regions are continuous on the boundaries therebetween, and accordingly, if an angle α is provided, then the projection image generation unit 130 can immediately specify the direction of the card 7.

If the recognition processing unit 120 provides the card ID, position information, and posture information at the point of time at which the card 7 is recognized first as card information to the projection image generation unit 130, then the projection image generation unit 130 decides the direction of the card 7 from the posture information (angle α) at the time using the first criterion depicted in FIG. 14(a) and generates a projection image according to the direction of the card 7.

While the recognition processing unit 120 continues to detect a card 7, the recognition processing unit 120 provides card information of the card 7 to the projection image generation unit 130. Although the projection image generation unit 130 specifies the direction of the card 7 on the basis of posture information, if the left side of the card 7 thereupon has an angle in the proximity of the boundary of the first criterion, depending upon the detection accuracy, the decision result of the card direction sometimes changes although the card 7 is not moved.

FIG. 14(b) depicts the second criterion for deciding a card direction. The second criterion depicted in FIG. 14(b) is used after the projection image generation unit 130 determines the direction of the card 7 using the first criterion depicted in FIG. 14(a). According to the second criterion depicted in FIG. 14(b), insensitive regions 42 are provided between direction decision regions and the direction decision regions do not continue across the boundaries therebetween.

The projection image generation unit 130 does not change a decided card direction even if the angle is included into an insensitive region 42 from a certain direction decision region. The projection image generation unit 130 decides that the card direction has changed in the case where the angle α changes so as to be included from a certain direction decision region into another decision region across an insensitive region 42. By providing such insensitive regions 42, it can be prevented that a result of the direction decision changes frequently.

In this manner, after the projection image generation unit 130 specifies the direction of the card 7 on the basis of the first criterion, it specifies the direction of the card 7 on the basis of the second criterion in which the insensitive regions 42 are provided between the direction decision regions. Consequently, the direction of the card 7 can be specified stably irrespective of the detection accuracy of the recognition processing unit 120.

The projection image generation unit 130 in the embodiment distinguishes and specifies the card direction among the four card directions. Consequently, in the card game, individually different card states can be provided to the four directions of the card 7, and choices in game operation can be increased. For example, it may be designated that the upward direction represents an operable state; the leftward direction represents an inoperable state; the downward direction represents a standby state; and the rightward direction represents an attacking state such that the projection image generation unit 130 generates a projection image according to the direction of the card 7.

In the card game in the embodiment, although a game operation using a game controller can be performed, since a game operation using the card 7 follows the user's feeling, that four operation choices can be created depending upon the direction of the card 7 provides an innovative user interface in the card game.

Now, an example in which a game operation is performed by an actual object different from the card 7 is described.

The instruction detection unit 140 detects an instruction to a card 7 or an instruction to a game application. The instruction to the card 7 or the game is created by an object (actual object) different from the card 7 by the user. The projection image generation unit 130 generates a projection image on the basis of the instruction detected by the instruction detection unit 140.

In the recognition processing unit 120, the object detection section 126 detects an object (actual object) different from the card 7. One example of the actual object is a finger of a hand of the user.

Figure 15:
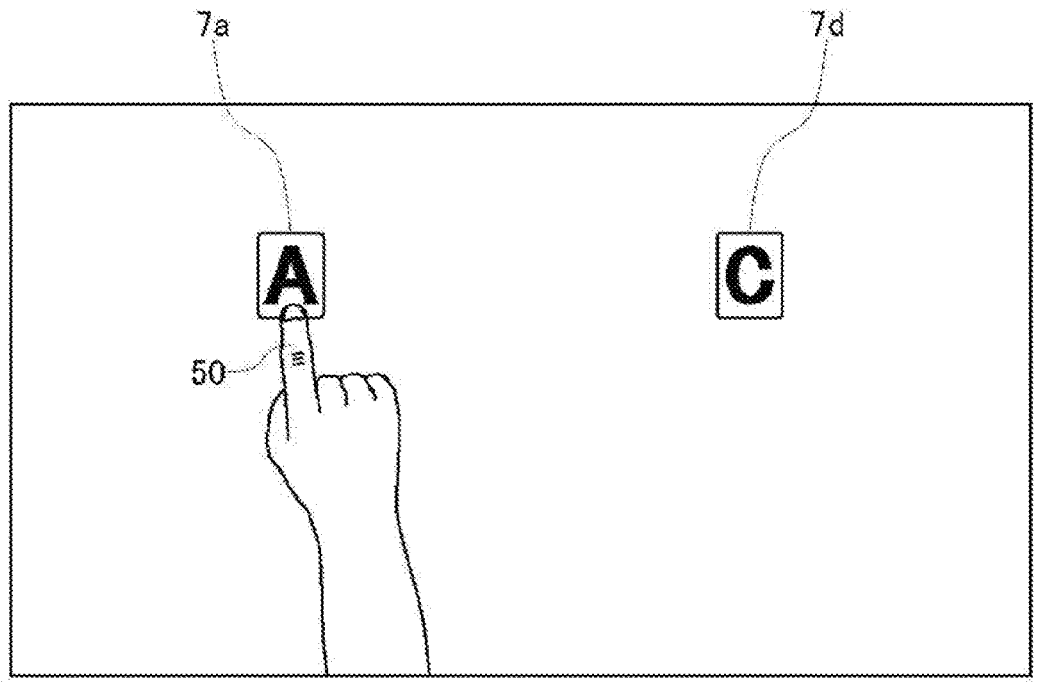
FIG. 15 is a view depicting an example of a corrected picked up image.

FIG. 15 depicts an example of a picked up image corrected by the image correction section 116. In this example, two cards 7a and 7d on which designs "A" and "C" are printed, respectively, are disposed in a projection region 4. The image correction section 116 corrects the picked up image using a correction parameter and provides the corrected picked up image to the recognition processing unit 120.

In the recognition processing unit 120, the card information generation section 124 generates a card ID, posture information, and vertex coordinates of the four corners of each of the cards 7*a* and 7*d* as card information and provides the card information to the instruction detection unit 140. Here, if a finger of a hand of the user enters the picked up image, then the object detection section 126 detects position information of the object included in the picked up image. The object detection section 126 provides the detected position information of the object to the instruction detection unit 140.

In the case where the object has a length equal to or greater than a predetermined length in the picked up image, the object detection section 126 detects that the object is a long object 50. Although, in the example depicted in FIG. 15, the long object 50 is a finger of a hand of the user, it may otherwise be, for example, a card designation bar prepared as an accessory to the card game. In the case where the image of the object is picked up with a length equal to or greater than the predetermined length, the object detection section 126 detects that the long object 50 has advanced in the image pickup region and provides position coordinates of a tip end of the long object 50 as detection information to the instruction detection unit 140.

The instruction storage unit 152 stores a game instruction associated with an object. The instruction storage unit 152 may store a game instruction according to the game progress in an associated relationship with an object. For example, in a certain game scene, a designation of a card by the long object 50 may be stored as an instruction for selecting an attack card, and in another game scene, a designation of a card by the long object 50 may be stored as an instruction for starting an attack. As described hereinabove, since the projection image generation unit 130 projects assist information for a game operation in the proximity of the card 7, the user can perform an intuitive game operation using a finger of a hand.

The additional object detection section 142 decides from the position coordinates of the tip end of the long object 50 and the vertex coordinates of the four corners of the card 7 whether or not the long object 50 has advanced to a location above the card 7. In the case where the position coordinates of the long object 50 are included in a rectangular region defined by the vertex coordinates of the four corners of the card 7, the additional object detection section 142 decides that the long object 50 has advanced to a location above the card 7 to detect that the long object 50 designates the card 7. The additional object detection section 142 refers to the instruction storage unit 152 to read out the game instruction for the designated card 7 and provides the card ID of the designated card 7 and the game instruction to the projection image generation unit 130. Receiving them, the projection image generation unit 130 generates a projection image reflecting the game instruction to the card 7.

It is to be noted that, if the additional object detection section 142 detects that the long object 50 has advanced in a rectangular region of the card 7, then in the case where the long object 50 continues to exist in the rectangular region for a predetermined period of time (for example, two seconds) after the detection, the additional object detection section 142 may decide that the long object 50 has advanced to a location above the card 7. For example, in the case where the user unintentionally touches with the card 7 or in the case where the user tries to arrange the position of the card 7, the user has no intention for card selection. Therefore, in the case where the card 7 continues to remain in the rectangular region for the predetermined period of time, the additional object detection section 142 may decide the same as a card designation operation by the long object 50 of the user.

Further, upon detection of a card designation operation, the additional object detection section 142 may determine it as a condition that the card 7 has not been moved. A card game involves a game operation for moving the disposition of a card 7, and when the disposition of a card 7 is to be moved, the user would move the card 7 by a finger of its hand. Therefore, in order to make a distinction from this game operation, the additional object detection section 142 may determine it as a condition that the card 7 is not moved, namely, that there is no change in position coordinates of the card 7 to detect a card designation operation by the long object 50.

Although the detection process of the long object 50 may be carried out on the basis of a picked up image by the infrared camera 22 as described hereinabove, the optical apparatus 20 may further include a different infrared camera for object detection. The optical apparatus 20 may include a light source for irradiating infrared laser light on the projection region 4 and a second infrared camera for picking up an image of the projection region 4. The object detection section 126 may detect an object advanced in the projection region 4 from within a picked up image of the second infrared camera.

Figure 16:
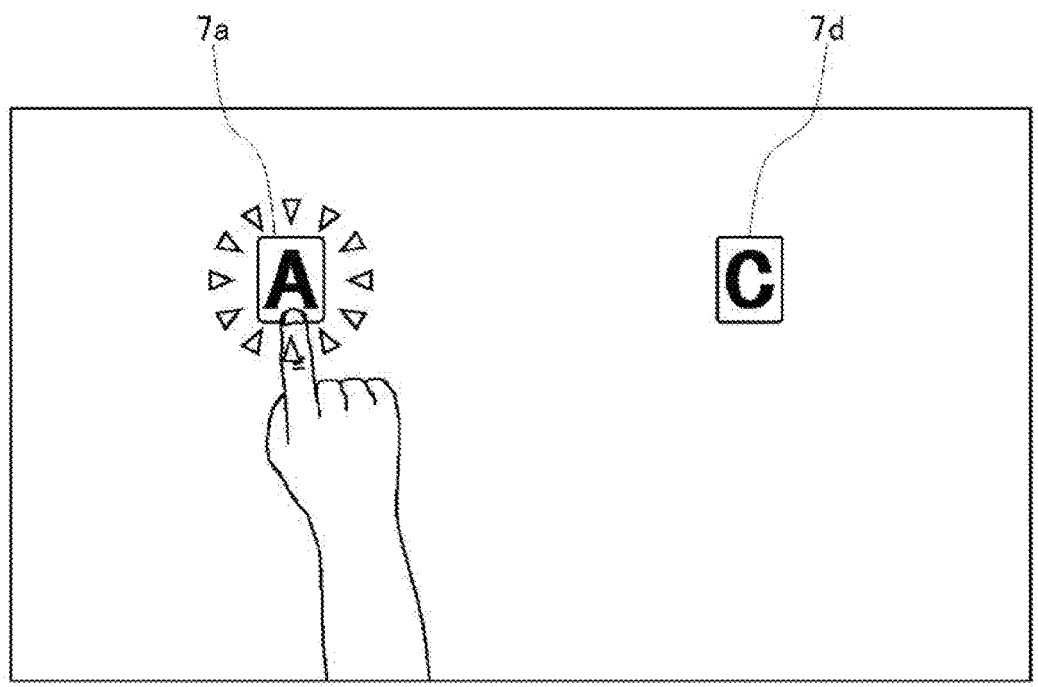
FIG. 16 is a view depicting an example of a projected projection image.

FIG. 16 depicts an example of a projection image projected in the projection region 4. Cards 7*a* and 7*d* are cards disposed in a projection region 4. While the projection image generation unit 130 projects white light to the card 7*a*, it projects a performance image indicating that this is designated around the card 7*a*. In this manner, the projection image generation unit 130 generates projection images different from each other for the card 7*a* before and after an instruction for the card 7*a* is detected and projects the projection images from the projector 21. Consequently, the user can know that the card 7*a* has been successfully designated appropriately. It is to be noted that, since the card 7*d* is not selected, the projection image to the card 7*d* does not change.

Figure 17:
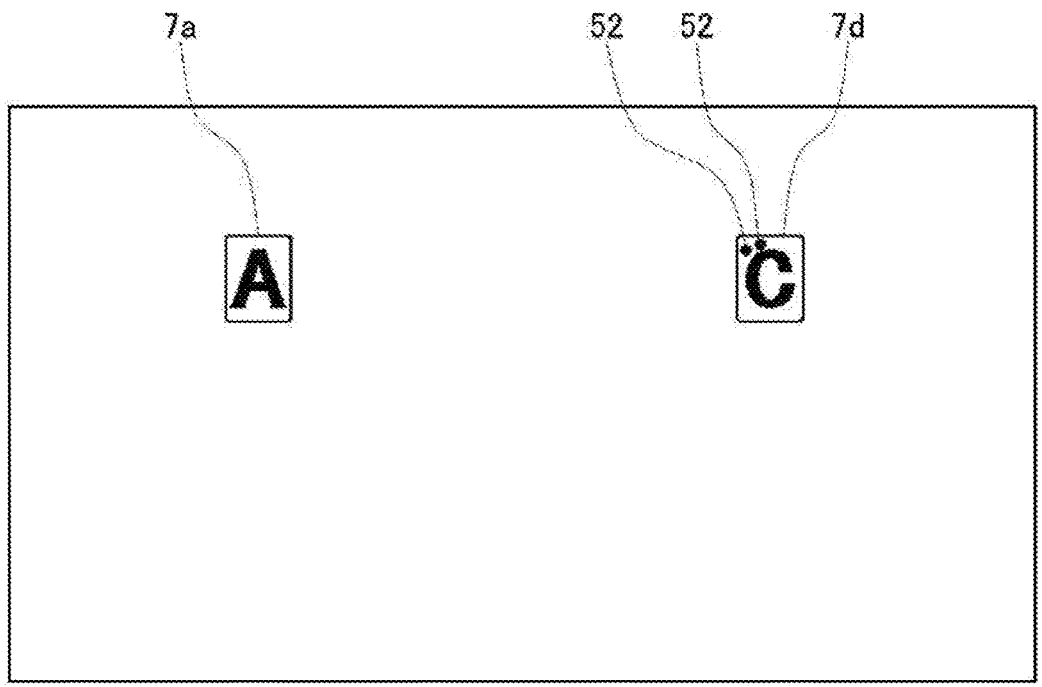
FIG. 17 is a view depicting an example of a corrected picked up image.

FIG. 17 depicts an example of a picked up image corrected by the image correction section 116. In this example, two cards 7*a* and 7*d* having designs "A" and "C" printed thereon, respectively, are disposed in the projection region 4. The image correction section 116 corrects the picked up image using a correction parameter and supplies the corrected picked up image to the recognition processing unit 120. In the recognition processing unit 120, the card detection section 122 detects a card ID, center coordinates, and posture information of each of the cards 7*a* and 7*d*, and the card information generation section 124 generates card information including the card IDs, vertex information of the four corners, and posture information of the cards 7*a* and 7*d* and provides the card information to the instruction detection unit 140.

In FIG. 17, an image of a state in which two item objects 52 are disposed on the card 7*d* is picked up. The item objects 52 are game coins prepared as accessories to the card game. The item objects 52 may be made of, for example, a retroreflective material in order to increase the detection accuracy thereof.

In the card game, a state destination method is available by which an item is placed on the card 7 to change the state of the card 7. The item objects 52 are utilized to change the state of the card 7, and the user can place the number of item objects 52 according to the states of the card 7 on the card 7. The object detection section 126 detects the item objects 52 included in the picked up image and provides position information of the detected item objects 52 to the instruction detection unit 140.

The additional object detection section 142 decides from the position information of the object and vertex coordinates of the four corners of the card 7 whether or not the object advances to a location above the card 7. In the case where the object advanced in a rectangular region of the card 7 does not go out of the rectangular region, namely, in the case where the object is detected only in the rectangular region, the additional object detection section 142 detects that the object is an item object 52. Although, in the example depicted in FIG. 17, the item object 52 is a game coin, it may otherwise be such an object as a pebble or the like. It is necessary for the item object 52 to be an object smaller than the size of the card 7. In the case where an object advanced in the rectangular region of the card 7 does not protrude from the rectangular region, the additional object detection section 142 detects that the item object 52 has advanced into the rectangular region and specifies the card ID of the card 7 from the rectangular region into which the item object 52 has advanced.

The instruction storage unit 152 stores a game instruction associated with an object. The instruction storage unit 152 may store a game instruction according to the game progress in an associated relationship with the object. Further, the instruction storage unit 152 may store a game instruction according to the quantity of item objects 52.

After the additional object detection section 142 specifies a card 7 designated by the item object 52, it refers to the instruction storage unit 152 to read out a game instruction for the card 7 and provides the card ID of the designated card 7 and the game instruction to the projection image generation unit 130. Receiving them, the projection image generation unit 130 generates a projection image that reflects the game instruction to the card 7.

It is to be noted that, in the case where the item object 52 is formed from a retroreflective material, since it has a high infrared reflection intensity, if an image of the item object 52 is picked up with a camera parameter same as that of the infrared camera 22 upon card detection, then the reflection intensity is so excessively high that the outline of the item object 52 is blurred and an image of the item object 52 is picked up in a size greater than the actual size. Therefore, the infrared camera 22 preferably adjusts a camera parameter upon card detection and a camera parameter for retroreflective material detection and executes image pickup such that an image is dark in the background but is light only in the item object 52. In the following description, the camera parameter for card detection is referred to as first parameter, and the camera parameter for retroreflective material detection is referred to as second parameter.

As one technique, if a shutter speed of the first parameter and a shutter speed of the second parameter are compared with each other, then the shutter speed of the first parameter is set relatively low and the shutter speed of the second parameter is set relatively high. Consequently, an image of the outline of the retroreflective material can be picked up with a size equal to the actual size of the same.

As another technique, a camera gain of the second parameter may be made lower than a camera gain of the first parameter. In short, with the camera parameter for retroreflective material detection, by lowering the sensitivity of the infrared camera 22, an image of the outline of a retroreflective material can be picked up with a size equal to the actual size of the same.

The techniques described above may be utilized alone or may be utilized in combination. The infrared camera 22 performs image pickup alternately switching the first parameter and the second parameter in time. Further, the infrared camera 22 may perform image pickup alternately switching the first parameter and the second parameter for each horizontal line, or may perform image pickup alternatively switching the first parameter and the second parameter for each pixel. In the case where the infrared camera 22 is a stereo camera, one of the cameras may operate with the first parameter while the other of the cameras operates with the second parameter. In the case where the item object 52 of a retroreflective material is utilized in this manner, card detection and item detection may be carried out with different camera parameters.

Now, an example in which a game operation is performed by placing, on a card 7 recognized already, a different card 7 is illustrated.

An overlap detection section 144 detects that a new card 7 is placed on a card 7 recognized already. After the overlap detection section 144 detects that the cards 7 are placed one on the other, the projection image generation unit 130 generates a projection image according to that the cards are placed one on the other.

In the recognition processing unit 120, the card information generation section 124 provides card information, which includes a card ID of a card 7, four vertex coordinates of the card 7, and posture information, to the instruction detection unit 140. If, at a position at which a certain card 7 is disposed, another card 7 is disposed while the certain card 7 is not removed, then the overlap detection section 144 detects that a card 7 of a different type is placed on.

Figure 18:
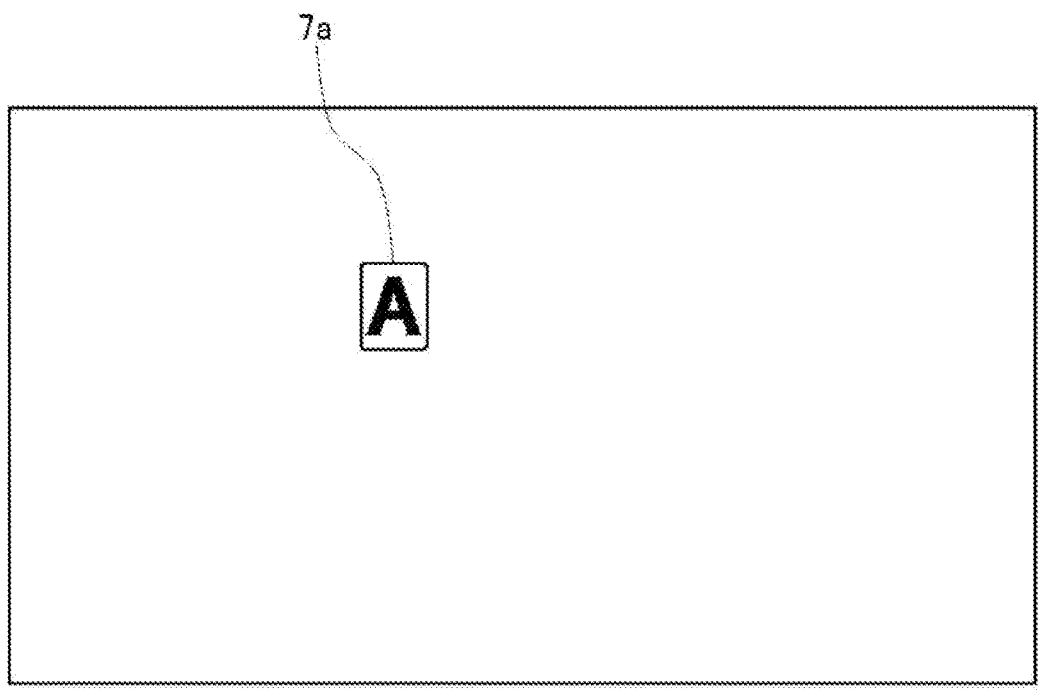
FIG. 18 is a view depicting an example of a corrected picked up image.

FIG. 18 depicts an example of a picked up image corrected by the image correction section 116. In this example, a card 7a having a design "A" printed thereon is displayed in a projection region 4. The image correction section 116 corrects the picked up image using a correction parameter and provides the corrected picked up image to the recognition processing unit 120. In the recognition processing unit 120, the card detection section 122 detects the card ID, center coordinates, and posture information of the card 7a, and the card information generation section 124 generates card information including the card ID, four vertex coordinates of the card 7, and posture information and provides the card information to the instruction detection unit 140.

The overlap detection section 144 recognizes the position of the detected card 7a from the card ID and the vertex coordinates of the four corners. If the card 7a is not moved in the projection region 4, then the overlap detection section 144 recognizes that the card 7a is stationary during that time. Here, if the user placed another card 7d on the card 7a, then the card information generation section 124 provides the card information including the card ID, four vertex coordinates, and posture information of the card 7d to the instruction detection unit 140. It is to be noted that, since the card detection section 122 is placed into a state in which it cannot detect the card 7a, the card information generation section 124 does not provide the card information of the card 7d to the instruction detection unit 140.

Figure 19:
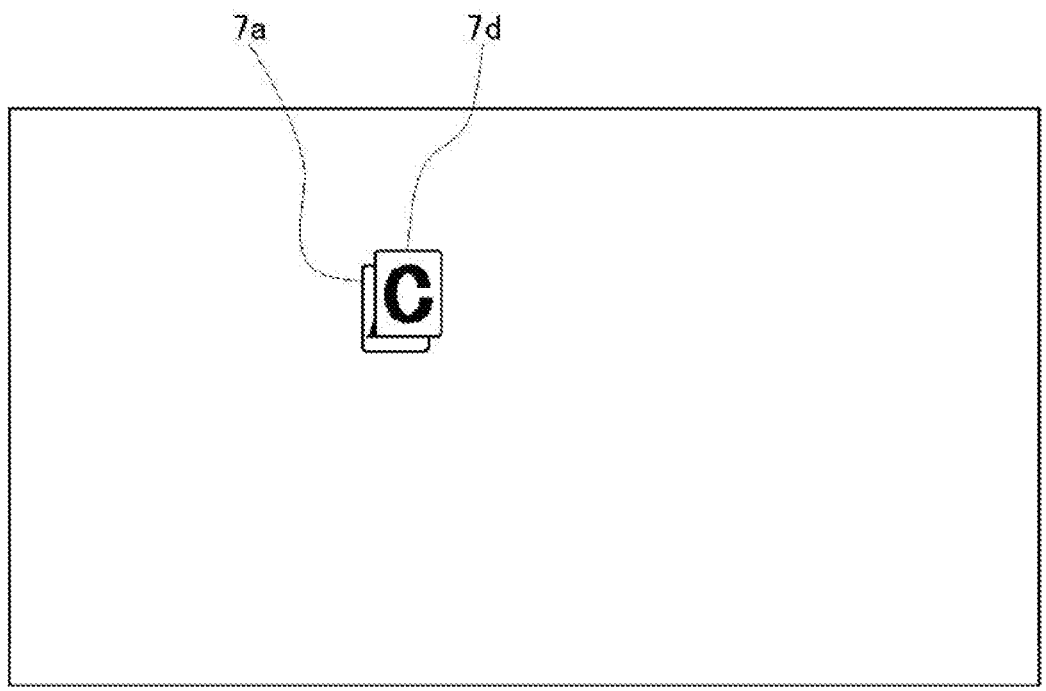
FIG. 19 is a view depicting a state in which cards are placed one on the other.

FIG. 19 depicts a state in which the card 7d is placed on the card 7a. If the overlap detection section 144 receives card information of the card 7d provided from the card information generation section 124, then it recognizes that the card 7a has disappeared and that the card 7d is disposed at the position at which the card 7a has been disposed. Therefore, the overlap detection section 144 detects that a new card 7d is placed on the card 7a.

In the case where the position information of the card 7a and the position information of the card 7d indicate that they have an overlapping relationship with each other, the overlap detection section 144 detects that the card 7d is placed on the card 7a. For example, the overlap detection section 144 determines coordinates of the center of gravity of the card 7a from the vertex coordinates of the four points of the card 7a and determines coordinates of the center of gravity of the card 7d from the vertex coordinates of the four points of the card 7d. Then, in the case where the distance between the coordinates of the two centers of gravity is equal to or smaller than a predetermined distance (for example, one half the short side), the overlap detection section 144 may decide that the card 7d is placed on the card 7a. It is to be noted that, in the case where, after provision of information of the card ID and so forth of the card 7a from the recognition processing unit 120 stops and then some time passes, provision of information of the card 7d at the same position as that of the card 7a is received, the overlap detection section 144 does not decide that the cards are placed one on the other. In this case, it may be decided that the user has replaced the card 7a with the card 7d.

If it is detected that the card 7d is placed on the card 7d, then the overlap detection section 144 notifies the projection image generation unit 130 of this. The projection image generation unit 130 generates a projection image according to the fact that the card 7d is placed on the card 7a and causes the projector 21 to project the projection image.

FIG. 20 depicts an image of a projection image. FIG. 20(a) depicts a projection image indicating that the attack force of the card 7a is 5000. In the case where the card 7a is detected as depicted in FIG. 18, the projection image depicted in FIG. 20(a) is projected to the proximity of the card 7a. If, from this state, the card 7d is placed on the card 7a as depicted in FIG. 19, then a projection image indicating that the attack force in the state in which card 7d is placed on the card 7a is 10000 as depicted in FIG. 20(b) is projected. In the card game of the embodiment, by causing a special effect arising from a plurality of cards 7 placed one on the other to occur, a new way of enjoying of the game can be provided.

Although the foregoing is a process in the case where cards 7 of different types are placed one on the other, a user frequently has a plurality of cards 7 of the same type. Therefore, in the following, processes in the case where cards 7 of the same type are placed one on the other are described.

The card detection section 122 in the embodiment specifies a card 7 from a design and cannot distinguish cards 7 of the same type from each other. Therefore, in the embodiment, by utilizing a card sleeve on which a mark is printed with invisible ink such that a card 7 is placed into the card sleeve, it is made possible to distinguish even cards 7 of a same type from each other.

FIG. 21(a) depicts a card sleeve 9. The card sleeve 9 is a film case having a shape of a bag body for receiving a card 7 therein, and a user can place a card 7 into the card sleeve 9 to protect the card 7. The card sleeve 9 is formed from a transparent sheet through which visible rays pass.

The card sleeve 9 has sleeve identification information (sleeve ID) 9a printed thereon with ink whose image can be picked up by the infrared camera 22. Preferably, this ink is invisible ink and the sleeve ID 9a is printed such that it cannot be viewed by the user. Although the user may have a plurality of card sleeves 9, preferably the sleeve IDs 9a of the card sleeves 9 do not overlap with each other.

FIG. 21(b) depicts a state in which a card 7 is placed in a card sleeve 9. In the case where cards 7 of the same type are to be placed one on the other, the user would use the cards 7 in a state in which the cards 7 are placed in the individual card sleeves 9. When a card ID is to be specified, the card detection section 122 reads the sleeve ID 9a. The card information generation section 124 provides the sleeve ID as card information relating to the card 7 to the overlap detection section 144 together with the card ID, vertex coordinates of the four corners, and posture information.

Referring to FIG. 18, in the recognition processing unit 120, the card detection section 122 detects the card ID, center coordinates, and posture information of the card 7a. The instruction detection unit 140 is provided with the sleeve ID from the card information generation section 124 together with the card ID, vertex coordinates of the four corners, and posture information of the card 7a.

The overlap detection section 144 recognizes the position of the detected card 7a from the card ID and the vertex information. If the card 7a is not moved in the projection region 4, then the overlap detection section 144 recognizes that the card 7a is stationary during that time. Here, if the user places a different card 7a of the same type on the card 7a, then the card information generation section 124 provides the sleeve ID to the instruction detection unit 140 together with the card ID, vertex coordinates of the four corners, and posture information of the card 7a.

Figure 22:
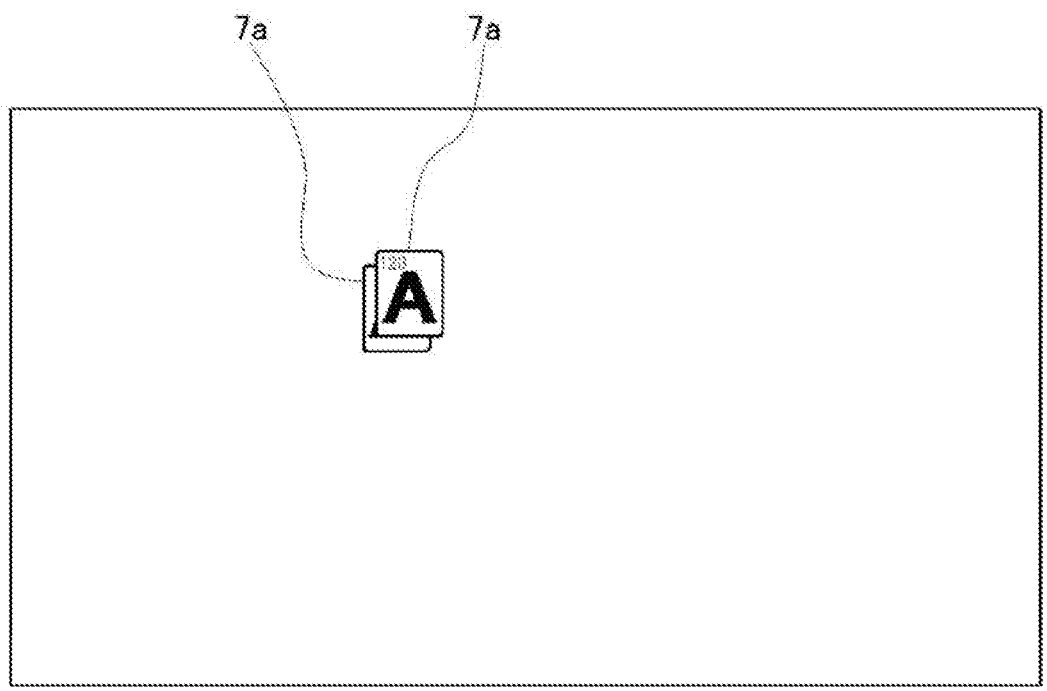
FIG. 22 is a view depicting a state in which cards are placed one on the other.

FIG. 22 depicts a state in which a card 7a is placed on another card 7a. Each card 7a is inserted in a card sleeve 9. It is to be noted that the sleeve IDs of the card sleeves 9 are different from each other. If the overlap detection section 144 receives the card information of the card 7a supplied from the card information generation section 124, then since there is a change in sleeve ID, the overlap detection section 144 recognizes that the new different card 7a is disposed at the position at which the original card 7a has been disposed. Therefore, the overlap detection section 144 detects that the different card 7a is placed on the card 7a.

When the overlap detection section 144 detects that the card 7a of the same type is placed on the card 7a, it notifies the projection image generation unit 130 of this. The projection image generation unit 130 generates a projection image according to the fact that the card 7a is placed on the card 7a and causes the projector 21 to project the projection image.

The present invention has been described in connection with the embodiment. This embodiment is exemplary, and it will be recognized by those skilled in the art that various modifications are possible in regard to a combination of the components and processes in the embodiment and also such modifications are included in the scope of the present invention.

While, in the embodiment, an actual object such as a coin is disposed on a card 7 to change the state of the card 7, the processing apparatus 10 may dispose (project) a virtual item on a card 7 to change the state of the card 7. Further, the projection image generation unit 130 may set a state of a card 7 by reading in save data recorded in a server or the processing apparatus 10 such that a projection image indicative of the state is projected from the projector 21 to the card 7.

While, in the embodiment, cards 7 of the same type are identified from each other depending upon the card sleeves 9, it may be designated by the user that cards 7 of the same type are placed one on the other. For example, a button image indicating that cards 7 of the same type are placed one on the other may be projected in the neighborhood of the cards 7 such that, if the user touches with a position to which the button image is projected, then it is detected by the overlap detection section 144 that the cards 7 of the same type are placed one on the other. At this time, the object detection section 126 may detect the position of a finger of the user in the projection region 4 such that, when the position of the finger comes to overlap with the projection position of the button image, the overlap detection section 144 may detect that the cards 7 of the same type are placed one on the other. It is to be noted that, if a speech recognition section 146 recognizes utterance of "same cards are placed one on the other" from the user, then the overlap detection section 144 may detect that the cards 7 of the same type are placed one on the other.

REFERENCE SIGNS LIST

1 . . . Image projection system, 3 . . . Display apparatus, 4 . . . Projection region, 5 . . . Image pickup region, 7, 7a, 7b, 7c, 7d . . . Card, 8, 8a . . . Mark, 9 . . . Card sleeve, 10 . . . Processing apparatus, 20 . . . Optical apparatus, 21 . . . Projector, 22 . . . Infrared camera, 23 . . . Visible light camera, 100 . . . Picked up image acquisition unit, 102 . . . Position acceptance unit, 104 . . . Display processing unit, 110 . . . Image conversion unit, 112 . . . Card detection section, 114 . . . Region specification section, 116 . . . Image correction section, 120 . . . Recognition processing unit, 122 . . . Card detection section, 124 . . . Card information generation section, 126 . . . Object detection section, 130 . . . Projection image generation unit, 140 . . . Instruction detection unit, 142 . . . Additional object detection section, 144 . . . Overlap detection section, 146 . . . Speech recognition section, 150 . . . Mark storage unit, 152 . . . Instruction storage unit, 154 . . . Performance storage unit.

INDUSTRIAL APPLICABILITY

The present invention can be utilized in a technical field in which an image is projected from a projector that is a projection apparatus.

The invention claimed is:

1. A processing apparatus comprising:
a picked up image acquisition unit configured to acquire a picked up image obtained by picking up an image of a region including a projection region projected by a projector;
a recognition processing unit configured to execute a recognition process of a card included in the picked up image;
a projection image generation unit configured to generate a projection image to be projected by the projector on a basis of the card recognized by the recognition processing unit; and
an instruction detection unit configured to detect an instruction for the card, wherein
the recognition processing unit detects an object different from the card in the picked up image and provides detection information of the detected object to the instruction detection unit,
the instruction detection unit detects an instruction for the card from the detection information of the object provided thereto,
the projection image generation unit generates a projection image on a basis of the instruction for the card, and
the picked up image of the card is calibrated by determining a conversion matrix for converting the picked up image from a first direction into a picked up image from a second direction, and a homography matrix for correcting the aspect ratio of the converted picked up image.

2. The processing apparatus according to claim 1, wherein the recognition processing unit detects a finger of a hand of a user.

3. The processing apparatus according to claim 1, wherein the projection image generation unit generates projection images for the card, which are different before and after the instruction for the card is detected.

4. A projection image generation method for generating a projection image projected by a projector, comprising:
acquiring a picked up image obtained by picking up an image of a region including a projection region projected by the projector;
executing a recognition process of a card included in the picked up image;
generating a projection image projected by the projector on a basis of the recognized card; and
detecting an instruction for the card, wherein
the executing the recognition process detects an object different from the card in the picked up image,
the detecting an instruction detects an instruction for the card from detection information of the object,
generating a projection image generates a projection image on a basis of the instruction for the card, and
the picked up image of the card is calibrated by determining a conversion matrix for converting the picked up image from a first direction into a picked up image from a second direction, and a homography matrix for correcting the aspect ratio of the converted picked up image.

5. A non-transitory, computer readable storage medium containing a program, which when executed by a computer, causes the computer to carry out actions, comprising:
acquiring a picked up image obtained by picking up an image of a region including a projection region projected by a projector;
executing a recognition process of a card included in the picked up image;
generating a projection image to be projected by the projector on a basis of the recognized card; and
detecting an instruction for the card, wherein
the executing a recognition process includes detecting an object different from the card in the picked up image,
the detecting an instruction includes detecting the instruction for the card from detection information of the object,
the generating a projection image includes generating a projection image on a basis of the instruction for the card, and
the picked up image of the card is calibrated by determining a conversion matrix for converting the picked up image from a first direction into a picked up image from a second direction, and a homography matrix for correcting the aspect ratio of the converted picked up image.

6. The processing apparatus according to claim 1, wherein the first direction is an oblique direction and the second direction is from just above the projection region and a homography matrix for correcting the aspect ratio of the converted picked up image.

7. The processing apparatus according to claim 6, wherein a parameter for correction is determined before acquiring the picked up image, and a recognition process of the card is performed on a basis of a correction image obtained by correcting the picked up image.

\* \* \* \* \*